US012611721B2

(12) United States Patent　　(10) Patent No.:　US 12,611,721 B2
Choi et al.　　(45) Date of Patent:　Apr. 28, 2026

(54) LASER REFLOW APPARATUS AND LASER REFLOW METHOD

(71) Applicant: LASERSSEL CO., LTD., Asan-si (KR)

(72) Inventors: Jae Joon Choi, Gwangju-si (KR); Byung Roc Kim, Incheon (KR); Jae Koo Kim, Gimpo-si (KR); Ki Chul Jin, Cheonan-si (KR)

(73) Assignee: LASERSSEL CO., LTD., Asan-si (KR)

( * ) Notice: Subject to any disclaimer, the term of this patent is extended or adjusted under 35 U.S.C. 154(b) by 901 days.

(21) Appl. No.: 17/778,699

(22) PCT Filed: Dec. 10, 2019

(86) PCT No.: PCT/KR2019/017391
§ 371 (c)(1),
(2) Date: May 20, 2022

(87) PCT Pub. No.: WO2021/100960
PCT Pub. Date: May 27, 2021

(65) Prior Publication Data
US 2022/0410298 A1　　Dec. 29, 2022

(30) Foreign Application Priority Data
Nov. 21, 2019　(KR) ........................ 10-2019-0150526

(51) Int. Cl.
*B23K 1/005*　(2006.01)
*B23K 3/08*　(2006.01)
(Continued)

(52) U.S. Cl.
CPC .............. *B23K 1/0056* (2013.01); *B23K 3/08* (2013.01); *B23K 26/034* (2013.01);
(Continued)

(58) Field of Classification Search
CPC ............ B23K 26/0608; B23K 26/0732; B23K 26/0661; B23K 3/08; B23K 26/705
See application file for complete search history.

(56) References Cited

U.S. PATENT DOCUMENTS 6,072,150 A　6/2000　Sheffer
2004/0238522 A1　12/2004　Edwards et al.
(Continued)

FOREIGN PATENT DOCUMENTS

CN　101208275 A　6/2008
CN　107186336 A　9/2017
(Continued)

OTHER PUBLICATIONS

Extended European Search Report issued on Aug. 31, 2023, for corresponding European Patent Application No. 19953453.8 (6 pages).
(Continued)

*Primary Examiner* — Thien S Tran
(74) *Attorney, Agent, or Firm* — Hauptman Ham, LLP

(57) ABSTRACT

The laser reflow apparatus of the present invention comprises a laser pressurization head module for pressing a bonding object, which includes a plurality of electronic components arranged on a substrate by a transmissive pressurization member while irradiating a laser beam through the pressurization member, to bond the electronic components to the substrate; and a bonding object transfer module for transferring the bonding object having transferred from one side of the laser pressurization head module to carry the bonding object to the other side thereof after passing through a reflow process of the laser pressurized head module.

3 Claims, 35 Drawing Sheets

(51) Int. Cl.

| | | |
|---|---|---|
| *B23K 26/03* | (2006.01) |
| *B23K 26/06* | (2014.01) |
| *B23K 26/066* | (2014.01) |
| *B23K 26/073* | (2006.01) |
| *B23K 26/70* | (2014.01) |
| *B23K 101/36* | (2006.01) |

(52) U.S. Cl.

CPC ...... *B23K 26/0608* (2013.01); *B23K 26/0661* (2013.01); *B23K 26/0732* (2013.01); *B23K 26/705* (2015.10); *B23K 2101/36* (2018.08)

(56) References Cited

U.S. PATENT DOCUMENTS

| | | | | |
|---|---|---|---|---|
| 2020/0251442 A1 * | 8/2020 | Choi | .................. | B23K 26/0608 |
| 2021/0220945 A1 * | 7/2021 | Choi | .................... | B23K 1/0056 |

FOREIGN PATENT DOCUMENTS

| | | | | |
|---|---|---|---|---|
| CN | 109103116 | A | | 12/2018 |
| CN | 110326096 | A | | 10/2019 |
| JP | S62-169769 | U | | 10/1987 |
| JP | H4-44390 | A | | 2/1992 |
| JP | H11287614 | A | * | 4/1998 |
| JP | 2008-529264 | A | | 7/2008 |
| JP | 2010-114103 | A | | 5/2010 |
| JP | 2013-4532 | A | | 1/2013 |
| JP | 5167072 | B2 | * | 3/2013 |
| JP | 5336086 | B2 | | 11/2013 |
| JP | 2019-130584 | A | | 8/2019 |
| KR | 10-2005-0099874 | A | | 10/2005 |
| KR | 10-2006-0003165 | A | | 1/2006 |
| KR | 10-0662820 | B1 | | 12/2006 |
| KR | 10-2008-0070217 | A | | 7/2008 |
| KR | 10-1143838 | B1 | | 5/2012 |
| KR | 101245356 | B1 | * | 8/2012 |
| KR | 10-1271654 | B1 | | 6/2013 |
| KR | 10-1446942 | B1 | | 10/2014 |
| KR | 10-2017-0039836 | A | | 4/2017 |
| KR | 101937360 | B1 | * | 7/2017 |
| KR | 10-2018-0043589 | A | | 4/2018 |
| KR | 10-2018-0137887 | A | | 12/2018 |
| TW | 201908042 | A | | 3/2019 |
| WO | 2019/017650 | A1 | | 1/2019 |

OTHER PUBLICATIONS

International Search Report issued Aug. 11, 2020, corresponding to International Application No. PCT/KR2019/017391 citing the above reference(s).

\* cited by examiner

Figure 2:
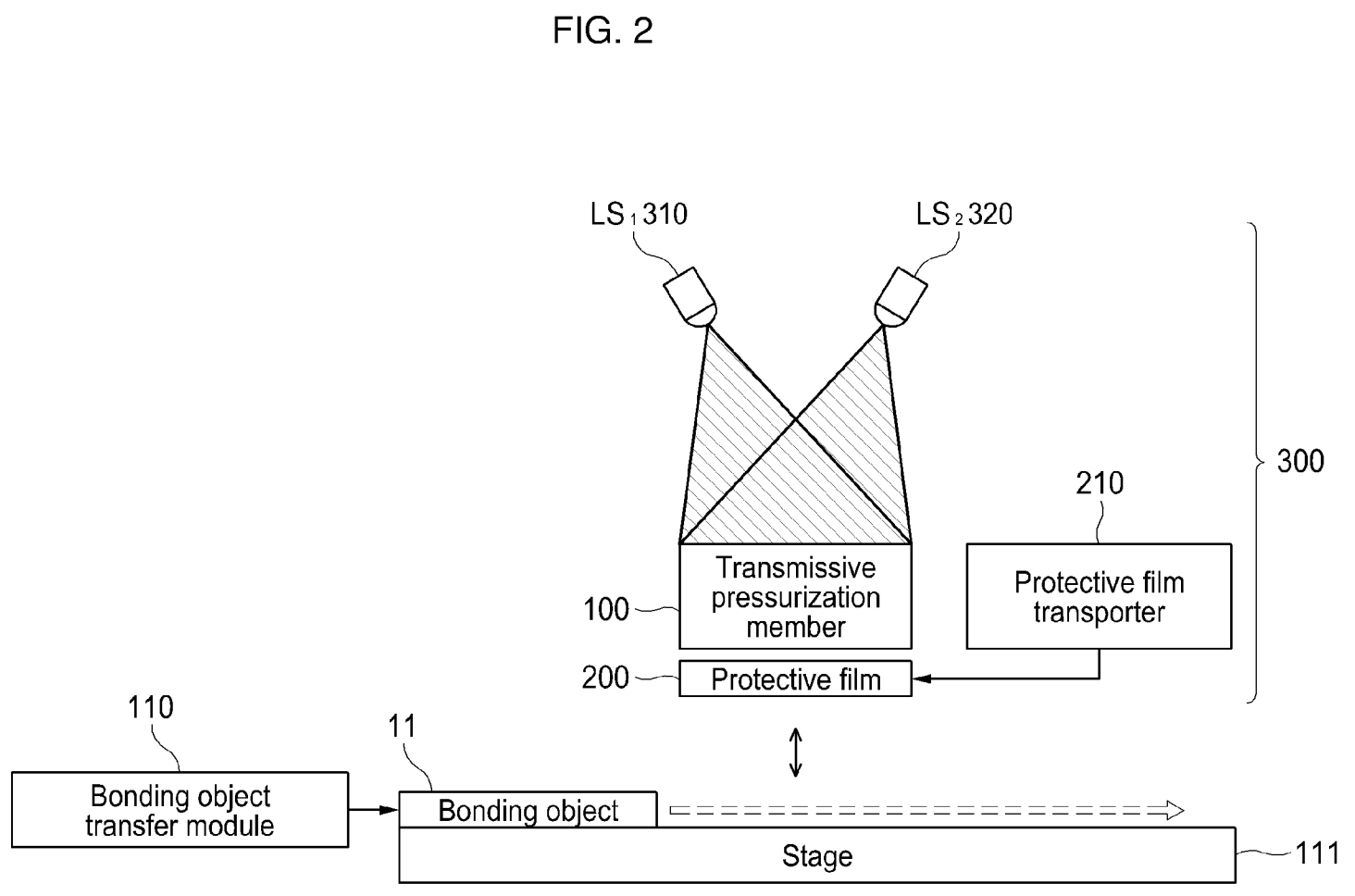

210 — Protective film transporter

LS₂ 320

LS₁ 310

Transmissive pressurization member

100

Protective film

200

Stage

111

Bonding object

11

Bonding object transfer module

LASER REFLOW APPARATUS AND LASER REFLOW METHOD

CROSS-REFERENCE TO RELATED APPLICATION

The present application is a national stage filing under 35 U.S.C § 371 of PCT application number PCT/KR2019/017391 filed on Dec. 10, 2019 which is based upon and claims the benefit of priorities to Korean Patent Application No. 10-2019-0150526, filed on Nov. 21, 2019, in the Korean Intellectual Property Office. Both of the aforementioned applications are hereby incorporated by reference in their entireties.

TECHNICAL FIELD

The present invention relates to a laser reflow apparatus and a laser reflow method, and more particularly, to a laser reflow apparatus and method of a pressurization type that irradiates the laser while pressing a plurality of electronic components arranged on a substrate with a transmissive pressurization member and simultaneously bonding the electronic components.

BACKGROUND ART

In industrial laser processing, an application with micron-grade precision is micro-laser processing, widely used in the semiconductor industry, display industry, printed circuit board (PCB) industry, and smartphone industry. Memory chip technologies used in all electronic devices have been developed to reduce circuit line width to a minimum level to achieve circuit integration, device performance, and ultra-fast communication speeds. Recently, since it has been challenging to achieve the required technical level by simply reducing circuit line width, memory chips are being stacked vertically. Chip stacking technology up to 128 layers has already been developed by TSMC Corporation. Another technology of stacking up to 72 layers is already applied to mass production by Samsung Electronics and SK Hynix.

In addition, another technology for mounting various kinds of chips, including memory, microprocessor, graphics, wireless processor, and sensor processor chips in a single package, is being aggressively researched and developed. A considerable level of high technologies has already been applied in practice.

However, in the development of the technologies mentioned above, more and more electrons within the ultra-high-speed/ultra-high-capacity semiconductor chip have to participate in the signal processing process, so the power consumption has increased, raising the issue of cooling treatment against heat generation in chips. In addition, a technical issue of transmitting a large number of electrical signals at ultra-high speed has been raised to achieve the requirements of ultra-high-speed and ultra-high-frequency signal processing for more signals. In addition, due to a large number of signal lines, one-dimensional lead lines have become insufficient to deal with the signal interface to the outside of the semiconductor chip. Hence, the industry uses new methodologies such as the ball grid array (BGA) method (also known as Fan-In BGA or Fan-in Wafer-Level-Package (FIWLP)) that deals with the signal interface in a two-dimensional manner at the bottom of the semiconductor chip. Another technology is to deploy a Signal Layout Redistribution Layer under the ultrafine BGA layer at the bottom of the chip and arrange a second micro BGA layer under the Signal Layout Redistribution Layer (called Fan-Out BGA or Fan-Out Wafer-Level-Package (FOWLP) or Fan-Out Panel-Level-Package).

Recently, in the case of semiconductor chips, products with a thickness of less than 200 μm, including the Epoxy-Mold Compound (EMC) layer, have appeared. To attach a micron-class ultra-thin semiconductor chip with a thickness of only a few hundred microns to an ultra-thin PCB, you may apply a mass reflow (MR) process such as the Thermal Reflow Oven technology that is standard in the surface mount technology (SMT) process. However, it may cause various forms of soldering or bonding failures such as chip-boundary warpage, PCB-boundary warpage, and Random-Bonding Failure by Thermal Shock due to the CTE (CTE; Coefficient of Thermal Expansion) difference developed when the semiconductor chip is exposed in an air temperature of 100 to 300 degrees (° C.) for hundreds of seconds.

Accordingly, a laser reflow apparatus spotlighted in recent years employs a bonding mechanism in which the laser head module presses and irradiates the bonding object (semiconductor chip or integrated circuit (IC)) for a few seconds. The laser reflow apparatus may employ a surface light source corresponding to the size of the semiconductor chip or the IC.

Referring to Korean Patent No. 0662820 (hereinafter referred to as 'Prior Art No. 1') for the laser reflow apparatus of the conventional pressurization type disclosed are the configurations of flip-chip heating and pressing module that heats the flip-chip by irradiating the laser on the back and presses the same to a carrier substrate.

The conventional pressurization laser reflow apparatus disclosed in the Prior Art No. 1 is separated by a means for absorbing the chip and moving it to the bonding position and heating the back of the chip with a laser and simultaneously squeezing the chip into the carrier substrate. When bonding a plurality of semiconductor chips as a semiconductor strip, the working time increases since pressing a single semiconductor chip and irradiating the laser onto it must be performed repeatedly by the number of semiconductor chips.

On the other hand, referring to Korean Patent Application No. 2017-0077721 (hereinafter referred to as 'Prior Art No. 2'), a laser head can move in a horizontal direction to irradiate the laser on each flip-chip sequentially while the pressurization head presses several flip chips at the same time, or a single laser head irradiates the laser on several flip chips at the same time.

However, according to the conventional laser reflow apparatus configuration of the aforementioned Prior Art No. 2, it is difficult to irradiate the homogenized laser beam as the laser beam from a single laser source enters the plurality of flip chips disposed on the substrate at various angles. Accordingly, it is technically expected to have many difficulties to reflow a plurality of flip chips without defects uniformly.

Therefore, the conventional laser reflow apparatus disclosed in the Prior Art Nos. 1 and 2 has to suffer the increase in the overall working time since every flip-chip has to be pressurised and irradiated one by one. Uniform thermal energy cannot be transferred to each of the plurality of flip chips in horizontal arrangements in the substrates of various sizes by irradiating a single laser beam. Therefore, more research and development efforts are required to improve the defect rate in the bonding process.

DISCLOSURE OF INVENTION

Problem to be Solved by the Invention

The present invention is designed to solve the above problems. The present invention is configured to facilitate the adjustment of the size of the pressurization and laser irradiation area processed simultaneously by replacing the transmissive pressurization member to correspond to the size of various substrates. Accordingly, the present invention aims to provide a laser pressurization head module of a laser reflow apparatus that enables the process of simultaneous pressurization and laser reflow of a plurality of electronic components in enormous quantities while the failure rate is greatly improved.

In addition, the present invention aims to provide a laser pressurization head module of a laser reflow apparatus capable of mass processing a plurality of electronic components and significantly improving the defect rate by irradiating a homogenized laser beam while simultaneously pressing the electronic components.

In addition, the present invention is conFigured to independently adjust the pressure on each edge of the plate-shaped holder unit mounted with a transmissive pressurization member to correspond to the size of various substrates. Accordingly, the present invention aims to provide a laser pressurization head module of a laser reflow apparatus capable of mass processing while significantly improving the failure rate by irradiating a laser beam while simultaneously pressing a plurality of electronic components.

In addition, the present invention is conFigured to allow a conveyor system to import and export the bonding object, including a substrate mounted with a plurality of electronic components to the reflow treatment area at a time, regardless of its size, and continue to preheat the bonding object to a predetermined temperature during the import so that a stable temperature rise to the solder melting temperature is accomplished without defects during the laser reflow process. Accordingly, the present invention aims to provide a laser reflow apparatus capable of mass processing while significantly improving the failure rate by irradiating the laser beam while simultaneously pressing a plurality of electronic components.

In addition, the present invention is designed to prevent bonding defects of specific electronic components in advance by precisely monitoring the area in which the multi-laser beam is superimposed with a plurality of temperature sensors and immediately detecting and compensating for the temperature imbalance of the substrate and electronic components constituting the bonding object. Accordingly, the present invention aims to provide a multi-laser module of a laser reflow apparatus capable of mass processing while significantly improving the failure rate due to the temperature imbalance by irradiating the laser beam while simultaneously pressing a plurality of electronic components.

In addition, the present invention is conFigured to arrange the electronic components under the transmissive pressurization member to be located at the center of the pressurization area of the transmissive pressurization member. Thus the pressure on the electronic component at pressurization can be evenly applied without being biased to one side. Accordingly, the present invention aims to provide a laser reflow method for a laser reflow apparatus capable of mass processing while significantly improving the failure rate by irradiating the laser beam while simultaneously pressing a plurality of electronic components.

In addition, the present invention aims to provide a laser reflow method of a laser reflow apparatus that is capable of mass processing while significantly improving the failure rate by irradiating the laser beam while simultaneously pressing a plurality of electronic components as a result of sequentially controlling the irradiation and pressurization processes according to the predetermined conditions.

Means for Solving the Problem

To accomplish the purposes illustrated above, a laser reflow apparatus according to some embodiments of the present invention comprises: a laser pressurization head module conFigured to bond a plurality of electronic components to a substrate by irradiating the laser beam through a transmissive pressurization member to a bonding object including the plurality of electronic components arranged on the substrate while simultaneously pressing the plurality of electronic components with the transmissive pressurization member; and a bonding object transfer module conFigured to transport the bonding object imported from one side of the laser pressurization head module to the other side after a reflow process by the laser pressurization head module.

The laser pressurization head module comprises a holder unit for replaceable mounting of the transmissive pressurization member; and a probe unit provided over the holder unit for checking the flatness of the pressurization member mounted on the holder unit.

The laser beam is a square laser beam homogenized by a beam shaper.

The laser beams irradiated from two or more laser modules are superposed.

The holder unit comprises a base plate having a perforation formed in the center so that the transmissive pressurization member can be inserted and settled.

The transmissive pressurizing member is selected from a group consisting of quartz, sapphire, fused silica glass and diamond.

The holder unit further comprises a mask plate having a perforation formed in the center so that the laser beam can pass through, the mask plate being coupled to the top of the base plate with the transmissive pressurization member being settled in the base plate.

The perforation of the mask plate has a rectangular shape having an area greater than or equal to the pressurization area of the transmissive pressurization member.

The bottom surface of the base plate has a moderately rounded shape on the left and right edges.

The laser reflow apparatus further comprises: a flatness adjustment means for adjusting the flatness of the transmissive pressurization member by finely moving the corner of the base plate in the vertical direction, the flatness adjustment means being located at each corner of the base plate.

The flatness adjustment means comprises a pressing bracket installed at each corner of the holder unit and the transmissive pressurization member; and a vertical driving unit, installed on one side of the pressing bracket, for transporting the pressing bracket in a vertical direction.

The vertical driving unit comprises a ball screw and a motor for the vertical transport of the pressing bracket; and a guide member for guiding the linear movement of the pressing bracket.

The probe unit comprises a probe for measuring flatness by stabbing at least one point on the upper surface of the transmissive pressurization member; a moving means for moving the probe horizontally or vertically; and a probe bracket for fixing the probe and the moving means.

The probe is conFigured to probe four or more positions, including each corner point of the rectangular-shaped upper surface of the transmissive pressurization member.

The laser reflow apparatus further comprises a protective film conFigured to prevent fumes generated during the laser bonding process from adhering to the bottom surface of the transmissive pressurization member, the protective film being provided in the base part of the transmissive pressurization member.

The protective film is made from a polytetrafluoroethylene resin (PTFE) or a perfluoroalkoxy resin (PFA).

The protective film is supplied by a protective film transfer member of a reel-to-reel type for transporting the protective film wound in the form of a roll to one side while releasing it.

The transmissive pressurization member comprises: a substrate member having a square panel shape as a whole; a pressurization area member protruding on the bottom surface of the substrate member such that the planar shaped bottom surface of the pressurization area member corresponds to the plurality of electronic components.

The laser reflow apparatus further comprises: at least one indented step inwardly formed between the substrate member and the pressurization area member such that the size of the pressurization area member is smaller than the size of the substrate member.

A laser beam blocking layer is formed on the sides of the substrate member and the bottom and sides of the indented step.

The pressurization area member is divided by at least two by lattice grooves having a predetermined depth.

The laser beam blocking layer is further formed on the bottom and inner sides of the lattice grooves.

The laser beam blocking layer is selected from the group consisting of an Inconel coated layer, a diffuse reflection layer, a high reflection (HR) coated layer or any combination thereof.

The pressurization area member is a square in shape.

Both edges of the pressurization area member are chamfered or rounded.

The pressurization area member is further provided with an elastic damper layer.

The elastic damper layer is composed of silicon.

The laser pressurization head module comprises a holder unit for replaceable mounting of the transmissive pressurization member; a pressure balancer for resetting the self-weight of the holder unit and the transmissive pressurization member to zero by adding pressure in the opposite direction as much as the self-weight of the holder unit and the transmissive pressurization member while supporting the bottom of each corner of the holder unit; and at least one press unit for pressurizing each corner of the holder unit independently by a set pressure, the press unit being placed in a non-contact state above each corner of the holder unit.

The pressure balancer is composed of an air cylinder.

The pressure balancer is composed of an elastic spring.

The press unit is placed at each corner of the holder unit to press each corner of the holder unit independently by each set pressure.

The press unit comprises: a pressing bracket holding each corner of the holder unit in a non-contact state; and a press cylinder mounted on top of the pressing bracket for pressing the holder unit downwards by a set pressure.

The press cylinder comprises a precision pneumatic cylinder capable of finely setting and adjusting the pressure in kgf units.

The press cylinder further comprises a pressure sensor for measuring and feeding back the pressure at pressurization.

The laser pressurization head module further comprises an ionizer for cleaning the upper surface of the transmissive pressurization member from dust due to static electricity, the ionizer unit being placed above the holder unit.

The bonding object transfer module comprises an input conveyor on which the bonding object is seated for import, the bonding object consisting of a plurality of electronic components arranged on the substrate; a vacuum chuck for vacuum-absorbing and fixing the bonding object transferred from the input conveyor; and an output conveyor on which the laser reflow treated bonding object is seated for export.

Each of the input and output conveyors comprises a conveyor frame; a pair of wire caterpillars provided on both sides at the top of the conveyor frame; and a horizontal transporter for linear movement of the conveyor frame in a horizontal direction, the horizontal transporter being provided on one side of the conveyor frame.

Each of the input and output conveyors further comprises a width adjustment means for expanding and reducing the width of the conveyor frame to accommodate the bonding object of different sizes, the width adjustment means being provided on one side of the conveyor frame.

A preheating stage for preheating the bonding object to a predetermined temperature is provided on one side of the conveyor frame of the input conveyor.

A vision unit for monitoring the loading state of the bonding object is provided on one side of the vacuum chuck.

A picker unit for transporting the bonding object is provided in each space between the input conveyor, the output conveyor and the vacuum chuck.

The picker unit comprises: a vacuum absorption pad in planar shape; and a vertical driver for transporting the vacuum absorption pad in a vertical direction The vacuum chuck comprises a porous absorption plate for absorbing and fixing the bonding object; and a horizontal driver for reciprocating the porous absorption plate and a heating block from the input region through the laser reflow treatment region to the output region for the bonding object.

The porous absorption plate comprises a central absorption plate for absorbing the bottom middle portion of the bonding object; and a peripheral absorption plate for absorbing the bottom rim portion of the bonding object, the peripheral absorption plate being arranged to wrap around the circumference of the central absorption plate.

Suction holes for absorbing the bottom rim portion of the bonding object are formed in the peripheral absorption plate.

The peripheral absorption plate is formed of aluminium.

A heating block is further provided under the porous absorption plate.

The laser pressurization head module comprises a multi-laser module for superposed irradiation of a plurality of laser beams on the bonding object; and a temperature sensor for detecting the temperature of multiple points of the bonding object by irradiating light through a transmissive pressurization member, the temperature sensor provided in the region between the laser modules of the multi-laser module.

The multi-laser module consists of a pair of laser modules facing each other.

The temperature sensor is composed of a single infrared temperature sensor which sequentially irradiates infrared light at multiple points of the bonding object.

The single infrared temperature sensor is capable of sequentially irradiating infrared light at multiple points within the area where a plurality of laser beams are superposed.

The temperature sensor is composed of a plurality of infrared temperature sensors which simultaneously irradiate infrared light at multiple points of the bonding object.

The plurality of the infrared temperature sensor can sequentially irradiate infrared light at multiple points within the area where a plurality of laser beams is superimposed.

The multi-laser module further comprises a beam profiler for measuring the output and intensity of each laser beam.

In order to accomplish the purposes illustrated above, a laser reflow method according to some embodiments of the present invention is a laser reflow method of a laser reflow apparatus for bonding electronic components to a substrate by pressing a bonding object including a plurality of electronic components disposed on a substrate with a transmissive pressurization member and simultaneously irradiating a laser beam through the pressurization member, the method comprising: a) photographing by a vision unit the shape of arrangement of the electronic components within a predetermined range directly below the pressurization area of the transmissive pressurization member before the transmissive pressurization member presses the bonding object; b) determining whether the photographed shape of arrangement of the electronic components within the predetermined range corresponds to the pressurization area of the transmissive pressurization member; c) when it is determined that the electronic components are positioned to correspond to the pressurization area, irradiating the laser beam through a transmissive pressurization member to the bonding object while simultaneously pressing the bonding object by moving the transmissive pressurization member downwards; d) terminating the irradiation of the laser beam and moving the pressurization member upwards to release the pressurization state; and e) horizontally transporting the transmissive pressurization member to upwards of a predetermined range of the electronic components to be reflowed in the next turn.

The step b) comprises b1) determining from the photographed shape of arrangement of the electronic components within the predetermined range whether the electronic components are symmetrically disposed with reference to the centerline of the pressurization area of the transmissive pressurization member; and b2) determining that the arrangement of the electronic components corresponds to the pressurization area if the electronic components are symmetrically disposed with reference to the centerline of the pressurization area, or adjusting the horizontal position of the transmissive pressurization member so that the electronic components are symmetrically positioned with reference to the centerline of the pressurization area if the electronic components are determined not to be symmetrically disposed of.

The laser beams from two or more laser modules are superposed.

The laser modules are symmetrically arranged, and each laser beam has the same beam irradiation angle.

The laser beams from the laser modules are simultaneously irradiated.

The laser beams from the laser modules are sequentially irradiated.

The laser reflow method further comprises the step of preheating the bonding object from the bottom before the step c).

The surface temperature of the bonding object is maintained below 200° C. at the preheating step.

The laser reflow method comprises the step of heating the surface temperature of the bonding object to 200° C. or more by irradiating the laser beam to the bonding object through the transmissive pressurization member in the step c).

To accomplish the purposes illustrated above, a laser reflow method, according to some embodiments of the present invention, is a laser reflow method of a laser reflow apparatus for bonding electronic components to a substrate by pressing a bonding object, including a plurality of electronic components, disposed on a rectangular substrate with a transmissive pressurization member and simultaneously irradiating a laser beam through the pressurization member, the method comprising: a) moving the pressurization area of the transmissive pressurizing member downwards to contact the bonding object in a state in which no pressure is applied; b) irradiating the laser beam to the bonding object through the transmissive pressurization member; and c) terminating the irradiation of the laser beam and moving the transmissive pressurization member upwards.

The laser reflow method may further comprise the step of fixing the vertical movement of the transmissive pressurization member after the step a).

The laser reflow method may further comprise the step of applying a predetermined pressure to the transmissive pressurizing member after the step a); and the step of releasing the fixation of the vertical movement of the transmissive pressurization member after the step b).

The laser reflow method may further comprise the step of fixing the vertical movement of the transmissive pressurizing member after the step a); and the step of applying a predetermined pressure to the transmissive pressurization member after the step b).

The laser reflow method may further comprise the step of fixing the vertical movement of the transmissive pressurizing member after the step a); and the step of releasing the fixation of the vertical movement of the transmissive pressurization member after the step b).

The laser beams from two or more laser modules are superposed in the step b).

The laser beams from the laser modules are simultaneously irradiated.

The laser beams from the laser modules are sequentially irradiated.

The laser reflow method may further comprise the step of preheating the bonding object from the bottom before the step b).

The surface temperature of the bonding object is maintained below 200° C. at the preheating step.

Effect of the Invention

According to the present invention, as described above, it is possible to perform mass processing while significantly improving the failure rate by irradiating laser beam while simultaneously pressing a plurality of electronic components to transfer thermal energy evenly onto the electronic components.

In addition, since the mask plate and the transmissive pressurization member can be replaced to correspond to the substrate size and the arrangement of the electronic components, the defect rate is significantly reduced as all the various substrates can be uniformly reflowed.

In addition, according to the present invention, the problem of applying thermal damage to the substrate at the peripheral of the electronic components due to the laser beam leaking through the edge of the quartz that forms the pressurization member is prohibited. The deterioration of the substrate and components is prevented, and the defect rate is significantly reduced.

In addition, since it is possible to independently adjust the pressure on each edge of the holder unit mounted with the transmissive pressurization member, the failure rate may be caused by insufficient pressure or overpressure acting on a plurality of electronic components disposed on the substrate can be significantly improved.

In addition, a specific area of bonding objects, including a plurality of electronic components placed on the substrate, can be stably imported and exported at once to the laser reflow treatment area.

In addition, the temperature imbalance in the superposed irradiation area of the multi-laser beam can be immediately detected and compensated for through monitoring, which dramatically improves the bonding failure rate.

In addition, by adjusting the position of the transmissive pressurization member so that the electronic components are not overpressed at one side and the pressure is evenly distributed, the failure rate is greatly improved as the pressure acts on the plurality of electronic components disposed on the substrate is unbiased.

In addition, by sequentially and precisely controlling the pressure by the transmissive pressurization member and the laser beam irradiation by the laser module according to preset values, respectively, the bonding failures such as lousy solder contact and solder overflow that may be caused by insufficient pressure or overpressure acting on a plurality of electronic components disposed on the substrate can be significantly improved.

BRIEF DESCRIPTION OF DRAWINGS

FIG. 2 is a block diagram of FIG. 1.

FIG. 5 is a block diagram of a multi-laser beam module according to some embodiment of the laser reflow apparatus of the present invention.

FIG. 20A shows a case where the pressurization area edges are not treated.

FIG. 20B illustrates another case where the edges of the pressurization area are chamfered. FIG. 20C illustrates another case where the edges of the pressurization area are rounded.

FIG. 26A shows a porous absorption plate according to an embodiment of the present invention, and FIG. 26B illustrates a porous absorption plate according to another embodiment of the present invention.

FIG. 30A is a diagram in which the transmissive pressurizing member 100 is aligned with centerline Cn+1. FIG. 30B shows a diagram in which the transmissive pressurization member is pressurized and laser-irradiated with reference to the centerline Cn+1. FIG. 30C illustrates a diagram in which the transmissive pressurization member is moved to be aligned to the centerline Cn+2. FIG. 30D shows a diagram in which the transmissive pressurization member is moved again to be aligned with a modified centerline Cn+2'. FIG. 30E illustrates the transmissive pressurization member under pressurization and laser-irradiation at the modified centerline Cn+2'.

FIG. 31A is when the transmissive pressurization member, having completed the previous reflow treatment, moves upwards to the bonding object for the subsequent reflow treatment. FIG. 31B is a step in which the pressurization area of the transmissive pressurization member moves downward to contact the bonding object without applying pressurization. FIG. 31C is a step of irradiating the laser beam to the bonding object through a transmissive pressurization member. FIG. 31D is a step of terminating the irradiation of the laser beam and moving the transmissive pressurization member upwards

MODE(S) FOR CARRYING OUT THE INVENTION

The terms used herein are used only to describe some specific embodiments and are not intended to limit the scope of the present invention. Expressions in the singular form may include plural components unless the context explicitly means otherwise. As used herein, the terms "comprise", "include", and "has" are not intended to preclude the presence or addition of one or more other features, numbers, steps, operations, components, parts, or combinations thereof.

Unless otherwise specified herein, all terms used herein, including technical or scientific terms, represent the same meanings as commonly understood by those who have ordinary skill in the art to which the present invention pertains.

Terms such as those defined in commonly used dictionaries should be construed as having meanings consistent with the context of the relevant art and should not be interpreted in an ideal or excessively formal sense unless expressly defined herein.

Figure 1:
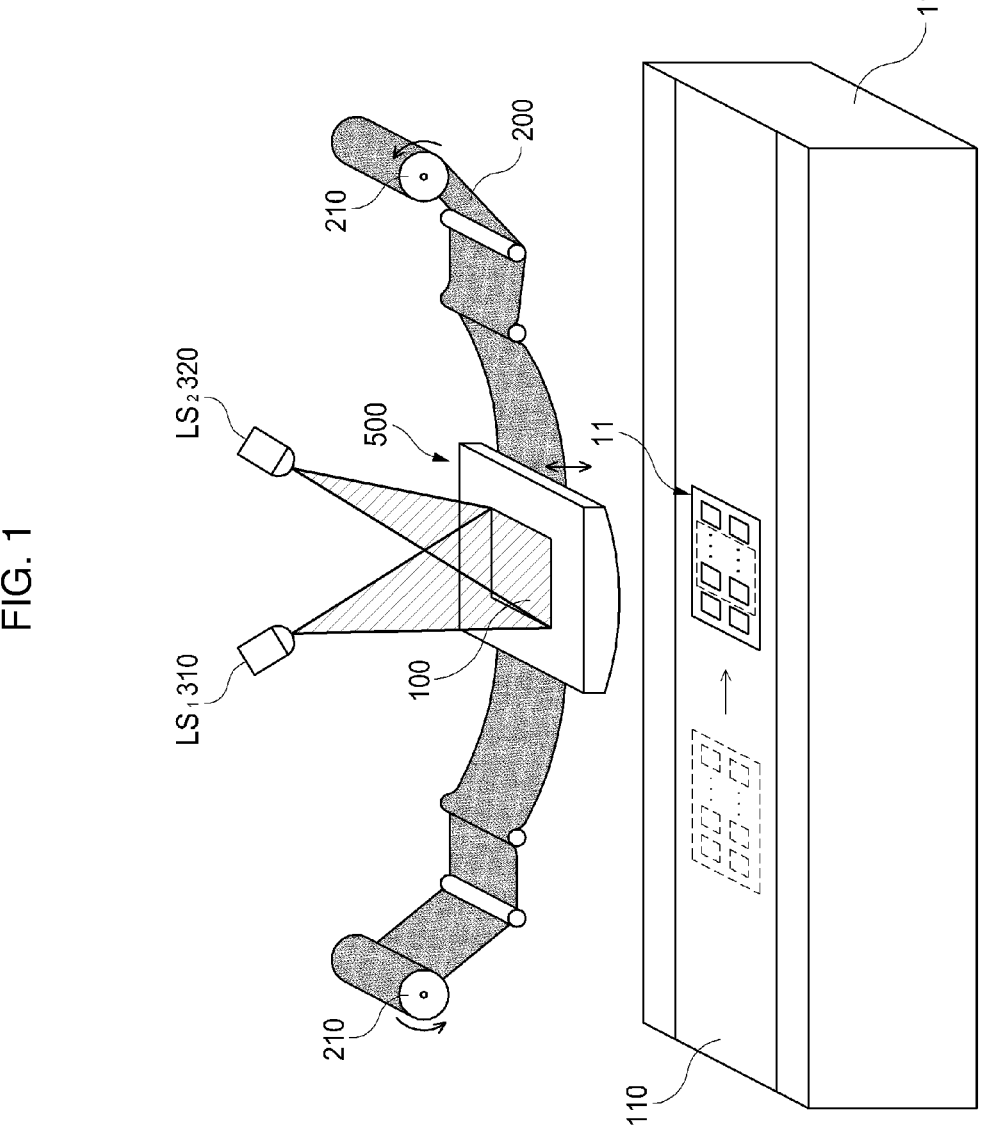
FIG. 1 is an exemplary view showing the configuration of the laser reflow apparatus of the present invention as a whole.

From now on, regarding FIGS. 1 and 2, the laser reflow apparatus of the present invention is described in detail.

FIG. 1 is an exemplary view showing the configuration of the laser reflow apparatus of the present invention as a whole, and FIG. 2 is a block diagram of FIG. 1.

As shown in FIGS. 1 and 2, the laser pressurization head module 300 of the laser reflow apparatus of the present invention comprises at least one multi-laser module 310, 320 irradiating the laser in the form of a surface light source on a bonding object 11. The bonding object 11 is transported while being supported on stage 111, in which a porous material having a structure capable of applying heat is formed. The laser pressurization head module 300 further comprises a transmissive pressurization member 100 that transmits a laser in the form of a surface light source and a protective film 200 that protects the transmissive pressurization member 100 from contamination.

First, the plurality of multi-laser modules 310, 320 (e.g., It may be implemented as dual laser modules according to an embodiment of the present invention) convert a laser beam that has been generated in a laser oscillator and transmitted through an optical fiber into a surface light source and then irradiates to the bonding object 11. The laser modules 310, 320 may be implemented to have a beam shaper (see FIG. 5) that converts a laser beam in the form of a spot into a surface light source and an optical system (see FIGS. 5 to 9) disposed of next to the beam shaper so that the surface light source emitted from the beam shaper is irradiated to the irradiation area of the bonding object 11. The optical system is conFigured such that a plurality of lens modules are disposed to be spaced apart from each other at an appropriate distance inside the barrel.

The laser modules 310, 320 may be raised or lowered along the z-axis, moved to the left or right along the x-axis, or moved along the y-axis for alignment with the bonding object 11.

In the laser pressurization head module 300 of the laser reflow apparatus of the present invention, a transmissive pressurization member 100 for pressing the bonding object 11 and a laser module 310, 320 for irradiating laser beams in the form of surface light sources on the bonding object 11 are structured independently of each other. Thus, it is possible to realize shortening the tact time and speed up the bonding operation for the plurality of bonding objects 11 as a whole by moving the laser modules 310, 320 to a plurality of irradiation positions of the bonding object 11 while pressing the whole bonding object 11 with the light-transmissive pressurization member 100.

The transmissive pressurization member 100 may move to the working or standby position by a transmissive pressurization member transporter (not shown). For example, the transmissive pressurization member transporter may descend or ascend the transmissive pressurization member 100 or move it to the left or right before descending or ascending.

In addition, although not shown in the Figures, the laser pressurization head module 300 of the laser reflow apparatus, according to the present invention, further includes a control unit (not shown) that controls the operation of the transmissive pressurization member transporter using the data input from the pressure sensor (not shown) and the height sensor (not shown in the Figure).

The pressure and height sensors may be installed in stage 111, supporting the bonding object 11, the transmissive pressurization member 100 and the transmissive pressurization member transporter. For example, the controller may receive data from the pressure sensor to control the transmissive pressurization member transporter so that the pressure reaches the target value. The controller may also receive data from the height sensor to control the transmissive pressurization member transporter to reach the target height.

In addition, the support member (not shown) may support the transmissive pressurization member transporter to be movable. For example, the support member may be implemented as a pair of gantry extended in parallel with the stage 111, which supports the transmissive pressurization member transporter to be movable to the x, y or z-axis.

The laser pressurization head module 300 of the laser reflow apparatus of the present invention may be implemented to include at least one actuator for exerting pressure on the transmissive pressurization member 100, at least one pressure sensor for sensing the pressure on the transmissive pressurization member 100, and at least one height sensor for detecting the height of the transmissive pressurization member 100. The pressure sensor may be implemented, for example, by at least one load cell, and a linear encoder may implement the height sensor.

The pressure applied to the bonding object can be adjusted through the pressure sensor. In the case of sensing a large area, it is possible to control the pressure so that the same pressure can be transmitted to the bonding object by using multiple actuators and pressure sensors. A plurality of height sensors can provide technical data to find the height value when boding the bonding object and find a more accurate value for the bonding height. They perform the function of controlling the exact height when performing a process that requires maintaining a constant height level.

In addition, the transmissive pressurization member 100 may be implemented as a base material for transmitting a laser output from the laser modules 310, 320. The base material of the transmissive pressurization member 100 can be implemented in any beam-permeable material.

The base material of the transmissive pressurization member 100 may include, for example, quartz, sapphire, Fused Silica Glass, and diamond. However, the physical properties of the transmissive pressurization member made of quartz are different from those of the transmissive pressurization member made of sapphire. For example, when irradiating a 980 nm laser, the transmission ratio of the transmissive pressurization member made of quartz is 85% to 99%, and the temperature measured in the bonding object is 100° C. On the other hand, the transmission ratio of the transmissive pressurization member made of sapphire is 80% to 90%, and the temperature measured in the bonding object is 60° C.

The quartz performs better than the sapphire in light transmittance and heat loss, which are required factors for the bonding process. However, the inventors of the present application have repeatedly tested the transmissive pressurization member 100 for laser reflow apparatus and found that the transmissive pressurization member 100 implemented in quartz material has a problem in that cracking occurs during laser bonding or burning appears on the bottom surface to result in poor bonding quality. It was analyzed that the gas or fumes generated during the laser bonding process adhere to the bottom surface of the light-transmissive pressurization member 100. The laser's heat is concentrated on the part to which the fumes are attached, increasing thermal stress.

To prevent damage to and improve the durability of the transmissive pressurization member 100 made of quartz, a thin film coating layer can be formed on the bottom surface of the transmissive pressurization member 100. The thin-film coating layer formed on the bottom surface of the transmissive pressurization member 100 may be implemented by a dielectric coating, SiC coating or a metal coating.

The laser pressurization head module 300 of the laser reflow apparatus, according to the present invention, is implemented, as shown in FIG. 1, to include a protective film 200 that prevents the fumes generated during the laser bonding process from sticking to the bottom surface of the transmissive pressurization member 100, and a protective film transporter 210 for transporting the protective film 200.

The protective film transporter 210 may be implemented in a reel-to-reel type in which the protective film 200 in the form of a roll is released and transported to the other side. The protective film 200, for example, is preferably made from a material with a maximum operating temperature of more than 300° C. and a continuous operating temperature of at least 260° C. For example, the protective film 200 can be made from a polytetrafluoroethylene resin (PTFE, commonly referred to as a Teflon resin; Polytetrafluoroethylene, PTFE) or Perfuoroalkoxy resin (PFA). PFA is a product developed by improving the heat resistance of Fluorinated Ethylene Propylene resin and is a highly functional resin whose continuous operating temperature is recorded at 260° C., such as Polytetrafluoroethylene resin.

Figure 3:
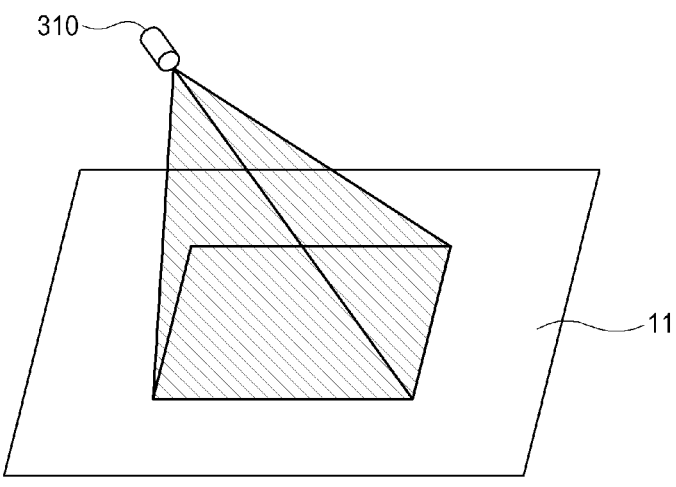
FIG. 3 is a conceptual diagram of a single laser beam module according to some embodiment of the laser reflow apparatus of the present invention.
Figure 4:
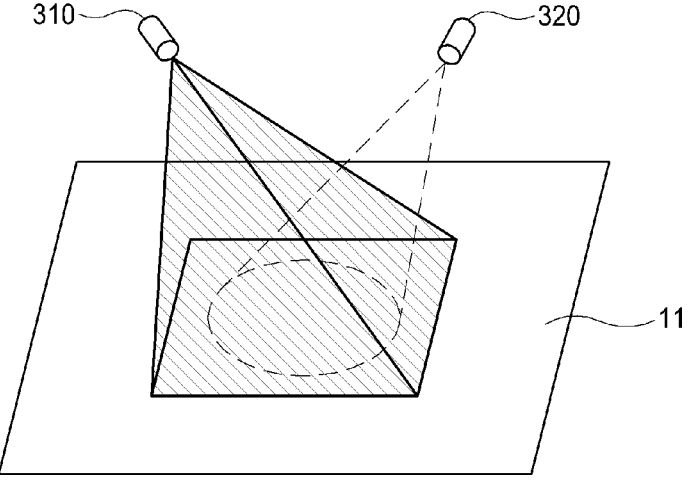
FIG. 4 is a conceptual diagram of a multi-laser beam module according to some embodiment of the laser reflow apparatus of the present invention.

FIG. 3 is a conceptual diagram of a single laser module according to some embodiment of the laser reflow apparatus of the present invention. FIG. 4 is a conceptual diagram of a multi-laser module according to some embodiment of the laser reflow apparatus of the present invention.

Referring to FIG. 3, the laser reflow apparatus of the present invention has a single laser module 310 to irradiate a single laser beam on a Printed Circuit Board (PCB) substrate. According to some embodiment, the PCB board may be a flexible circuit board (flexible PCB).

Referring to FIG. 3, the laser beam irradiated by the single laser module 310 onto the substrate with a homogenized intensity and a square beam shape.

On the other hand, referring to FIG. 4, the multi-laser module, according to some embodiment of the present invention, is composed of, for example, a first laser module 310 and a second laser module 320. In the region where the electronic components of the bonding object 11 are attached, the first and second laser modules 310, 320 are irradiated in a superposed state to increase the homogenization of the laser beam.

FIG. 4 shows that the first laser beam 310 is square-shaped, and the second laser beam 320 is circular-shaped, but both laser beams could be square-shaped. In addition, the first laser beam 310 and the second laser beam 320 may be irradiated simultaneously, or the second laser beam 320 may be irradiated sequentially after the preheating of the bonding object 11 by the first laser beam 310.

Figure 5:
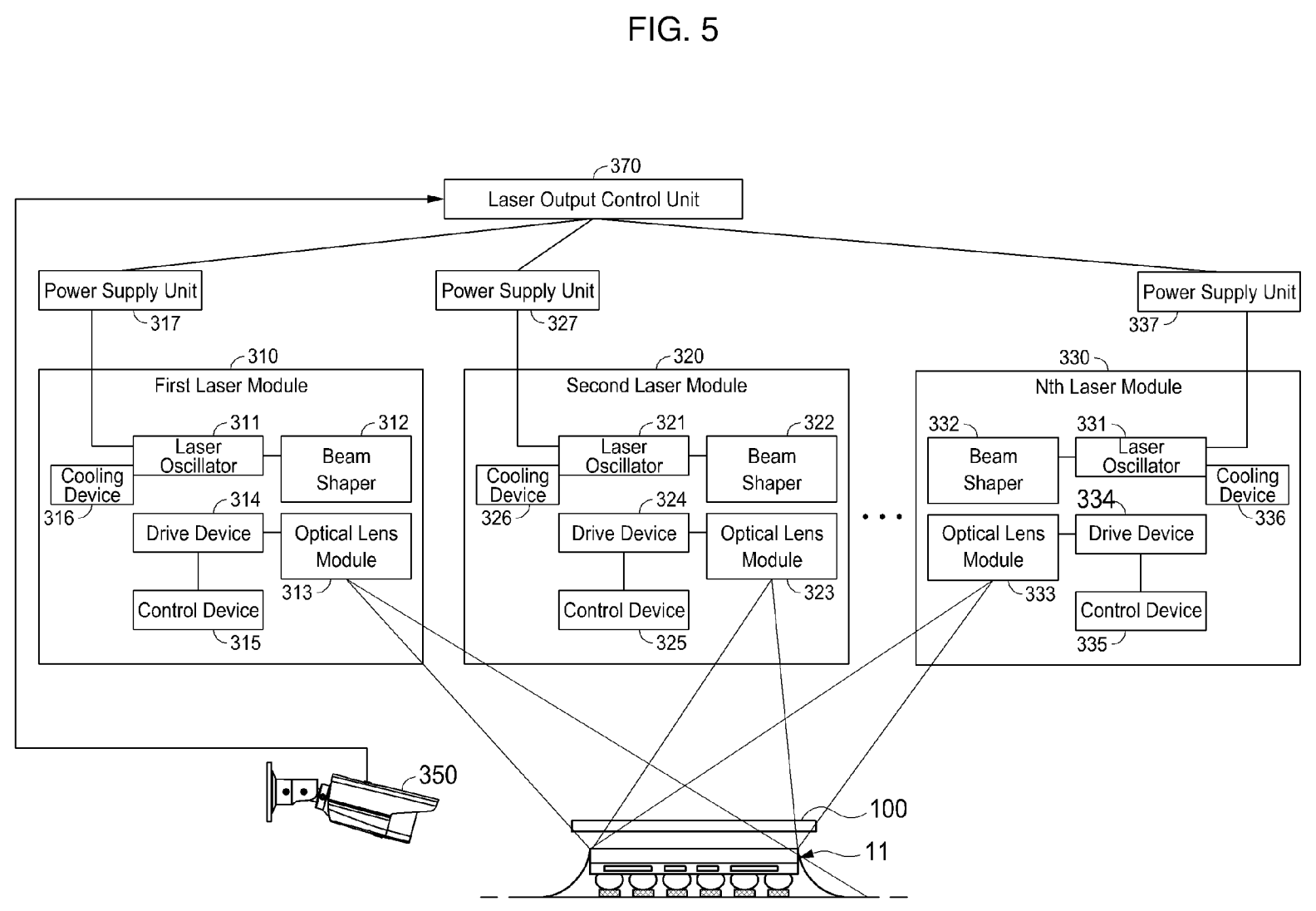

FIG. 5 is a block diagram of a multi-laser module according to some embodiment of the laser reflow apparatus of the present invention.

Referring to FIG. 5, each laser module 310, 320, . . . , 330 is conFigured to include laser oscillators 311, 321, 331 having cooling devices 316, 326, 336, beam shapers 312, 322, 332, optical lens modules 313, 323, 333, drive devices 314, 324, 334, control devices 315, 325, 335, and power supplies 317, 327, 337.

From now on, descriptions of the first laser module 310 from among the respective laser modules, which have identical configurations, are mainly provided to avoid overlapping descriptions, except where necessary.

The laser oscillator 311 generates a laser beam with a predetermined range of wavelengths and output power. The laser oscillator 311 may be made of, for example, a diode laser (LD), a rare-earth-doped fiber laser, or a rare-earth-doped crystal laser, and it may have a wavelength of '750 nm to 1200 nm', '1400 nm to 1600 nm', '1800 nm to 2200 nm' or '2500 nm to 3200 nm', respectively. Alternatively, it may include a medium for emitting the Alexandrite laser beam with a wavelength of 755 nm or a medium for emitting an Nd:YAG laser beam with a wavelength of 1064 nm or 1320 nm.

The beam shaper 312 converts the laser having a spot shape that has been generated in a laser oscillator and has been delivered through the optical fiber into an area beam with a flat top. The beam shaper 312 may include a square light pipe, a diffractive optical element (DOE), or a micro-lens array (MLA).

The optical lens module 313 is conFigured to emit the laser beam by adjusting the shape and size of the laser beam converted from the beam shaper into an area laser source by the beam shaper to electronic components mounted on a PCB substrate or to an irradiation zone. The optical lens module includes an optical system comprised of a plurality of lenses. A detailed description of the optical system will be provided below regarding FIGS. 6 to 9.

The drive device 314 is conFigured to move the distance and position of the laser module relative to the irradiation surface. The controller 315 controls the drive device 314 to adjust the beam shape, the size of beam area, beam sharpness and beam irradiation angle upon incidence of the laser beam. The controller 315 may also integrally control the respective operation of each part of the laser module 310 and the drive device 314.

On the other hand, the laser output control unit 370 is conFigured to control the amount of power supplied to each laser module from the power supplies 317, 327, 337 corresponding to each laser module 310, 320, 330, according to the program received through the user interface or a preset program. The laser output control unit 370 receives regional or overall reflow status information on the irradiation surface from at least one camera module 350 and controls each power supply 317, 327, 337 based on the received data. Alternatively, the control information from the laser output control unit 370 is transmitted to the control devices 315, 325, 335 of each laser module 310, 320, 330, and the control devices 315, 325, 335 may provide feedback signals for controlling the respective corresponding power supplies 317, 327, 337. Further, unlike in FIG. 6, it is also possible that a single power supply distributes power to each laser module. The laser output control unit 370 needs to control the power supply in such an instance.

In the case of a laser superposition mode, the laser output control unit 370 controls each laser module 310, 320, 330 and power supply 317, 327, 337 so that the laser beam from each laser module 310, 320, 330 has the required beam shape, beam area size, beam sharpness and beam irradiation angle. The laser superposition mode may be used when you preheat the area around the debonding target location with the first laser module 310 and heat the narrower reflow target area using the second laser module 320. Further, the laser superposition mode may also be used when the preheating function or additional heating function needs to be distributed to the first, second, third laser modules 310, 320, . . . 330 to acquire the necessary temperature profile.

When one laser beam source is distributed and inputted to each laser module, a function for simultaneously controlling the output and phase of each distributed laser beam may be provided in the laser output control unit 370. In this case, the beam flatness can be significantly improved by controlling the phase to induce offset interference between each laser beam, thereby further increasing energy efficiency.

In the case of a simultaneous multi-location operation mode, the laser output control unit 370 controls at least the beam shape, beam area size, beam sharpness, beam irradiation angle, and beam wavelength. A portion or all of the laser beam from each laser module is different. Also, in the case of dividing a single laser source to input the laser beam to each laser module, the laser output control unit 370 may have the function of simultaneously controlling the output and the phase of each of the separated laser beams.

The laser beam's size and output are controlled to perform or remove bonding between the substrate and the electronic components in the irradiation surface through this function. In particular, when removing the damaged electronic component from the substrate, the area of the laser beam may be minimized to the size of the corresponding electronic component so that heat from the laser beam is applied to a neighbouring electronic component or a normal electronic component on the substrate may be minimized. Accordingly, it is possible to remove only the damaged electronic components that are supposed to be released.

In the case of irradiating laser beams having different wavelengths for each of the plurality of laser modules, the laser module may include an individual laser module having a wavelength that is well absorbed by a plurality of material layers (e.g., EMC layer, a silicon layer, solder layer) included in the electronic component. Accordingly, accordinging to the present invention, the laser reflow apparatus may perform an optimized attaching, bonding, detaching or debonding process by selectively and differently increasing the temperature of the electronic component or the intermediate bonding material such as the solder. Specifically, the laser beam can penetrate both the EMC mould and the silicon layer to reach the electronic component's solder layer. All the energy of each laser beam is absorbed in the solder layer. Otherwise, the laser beam may heat the surface of the electronic component without penetrating the EMC mould layer so that heat can be conducted to the bonding portion or solder layer of the electronic component.

On the other hand, utilizing the above functions, a specific substrate area with the reflow target electronic component and its surroundings is preheated to a preset temperature by at least one laser beam. Then only the location of the reflow target electronic component is further heated to a reflow temperature at which the melting of the solder occurs by at least a one-second laser beam. With the selective heating effect, the present invention can also be used, for example, as a rework apparatus that efficiently removes only the failed electronic component from the substrate.

FIGS. 6 to 9 are block diagrams of the laser optic system applicable to the single and multi-laser modules of the laser reflow apparatus of the present invention.

Figure 6:
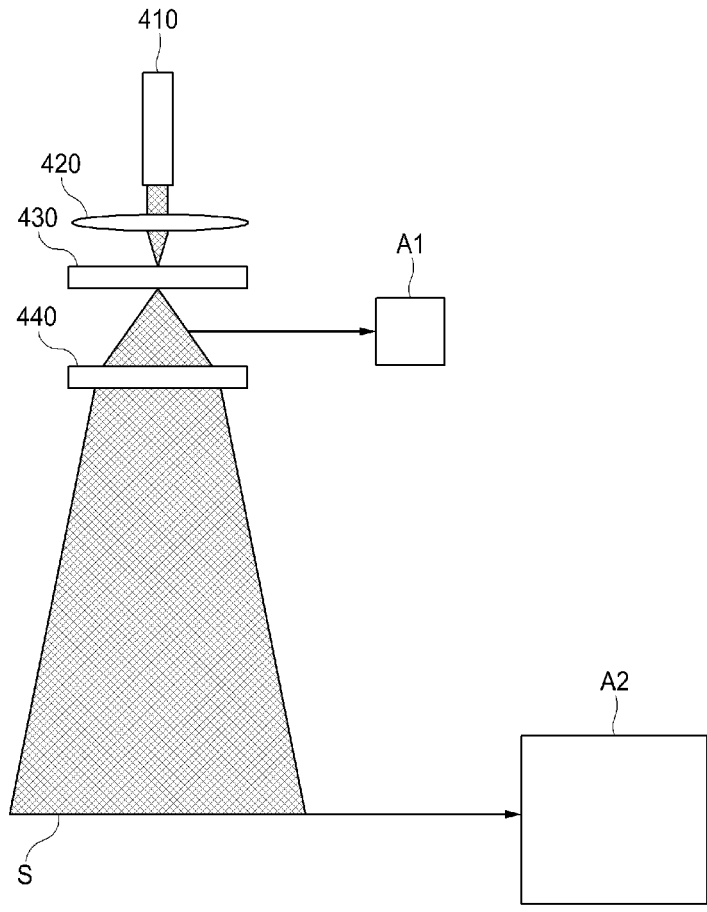
FIGS. 6 to 9 are diagrams of a laser optical system applicable to multi-laser beam modules according to some embodiment of the laser reflow apparatus of the present invention.

Referring to FIG. 6, the optical system is the simplest structure applicable to the present invention. When a laser beam emitted from the beam transmission optical fiber 410 is focus-aligned through the convex lens 420 and enters the beam shaper 430, the laser beam in the form of a spot from the beam shaper 430 is converted into a surface light source A1 having a flat top. The square laser beam A1 output from the beam shaper 430 is enlarged to the desired size through the concave lens 440 and then irradiated onto the imaging surface S in the form of an enlarged surface light source A2.

Figure 7:
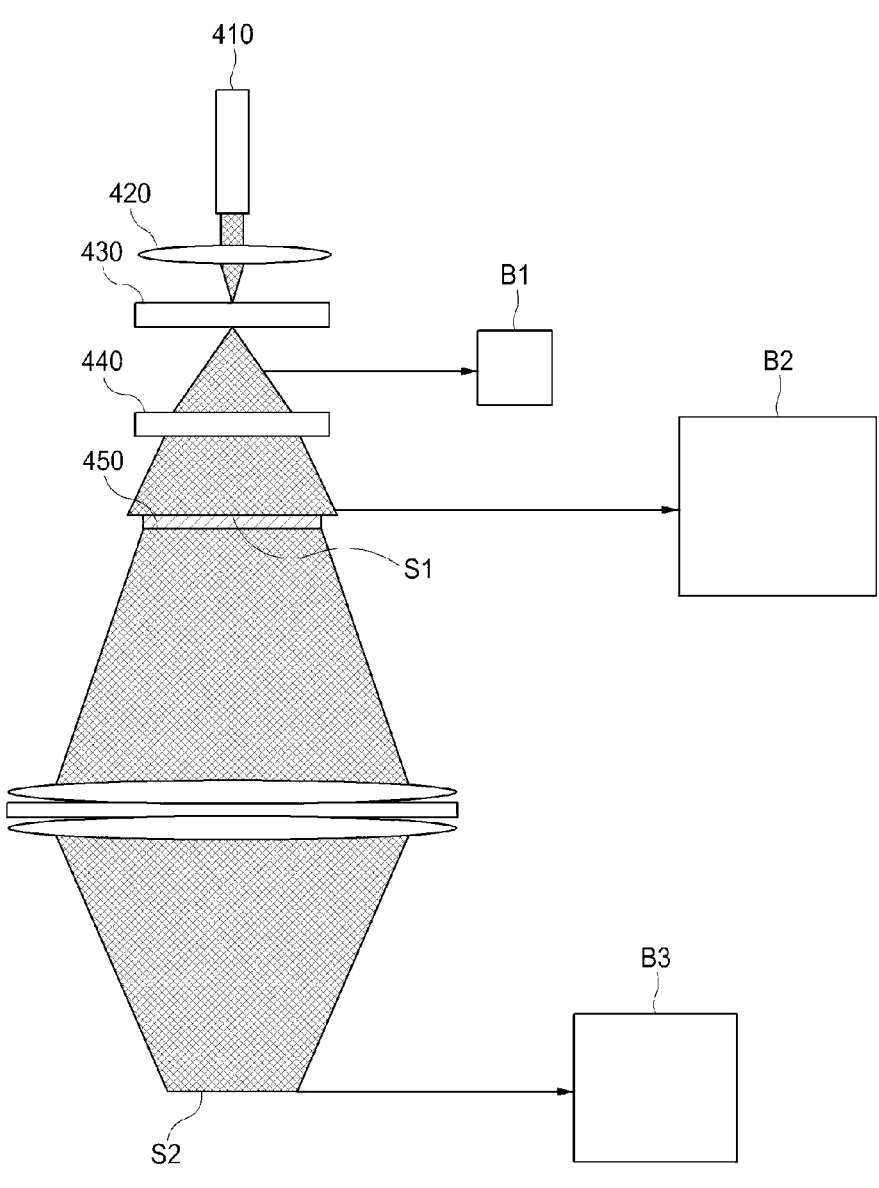

FIG. 7 is a block diagram of a laser optical system according to another embodiment of the present invention.

The surface light source B1 from the beam shaper 430 is enlarged to a predetermined size through the concave lens 440 to become the surface light B2 irradiated on the imaging surface S1. If the surface light B2 is further enlarged, the boundary or edge of the surface light source B2 may become blurred. Thus, to obtain an irradiated light having an irradiation surface with an explicit edge on the second imaging surface S2, a mask 450 is provided on the first imaging surface S1 to trim the edge.

The surface light source passing through the mask 450 is diminished or enlarged to the desired size while passing through the zoom lens module 460, having a combination of one or more convex lenses and concave lenses, thereby forming a square irradiated light B3 on the second imaging surface S2 on which the electronic components are disposed.

Figure 8:
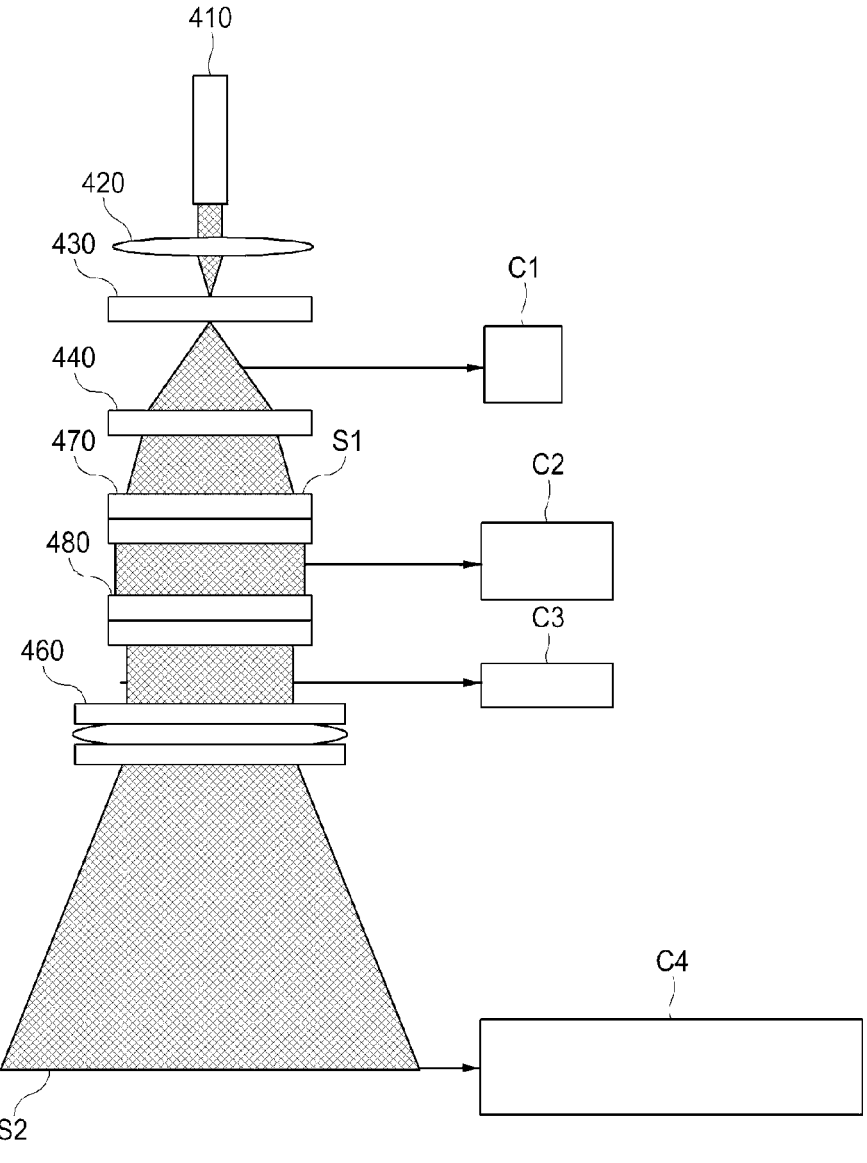

FIG. 8 is a block diagram of a laser optical system according to another embodiment of the present invention.

After the square surface light source C1 from the beam shaper 430 is enlarged to a predetermined size through the concave lens 440, it passes through at least a pair of cylindrical lenses 470 to be enlarged or diminished, for example, in the x-axis direction C2, and then it passes through at least a pair of different cylindrical lenses 480 to be enlarged or reduced, for instance, in the y-axis direction to be converted into a rectangular-shaped surface light source C3.

Here, the cylindrical lens has a shape corresponding to a cylinder cut into half in a longitudinal direction. It serves to enlarge or diminish the laser beam according to the arrangement of each lens in the vertical direction. The cylindrical lens adjusts the laser beam in the x or y-axis direction according to the structure of the lenses on the surface on which the lens is disposed.

The surface light source C3 passes through the zoom lens module 460 comprised of one or more convex and concave lenses to be enlarged or diminished to a predetermined size and then to form a rectangular irradiated light C4 on the second imaging surface S2 on which the electronic components are disposed.

Figure 9:
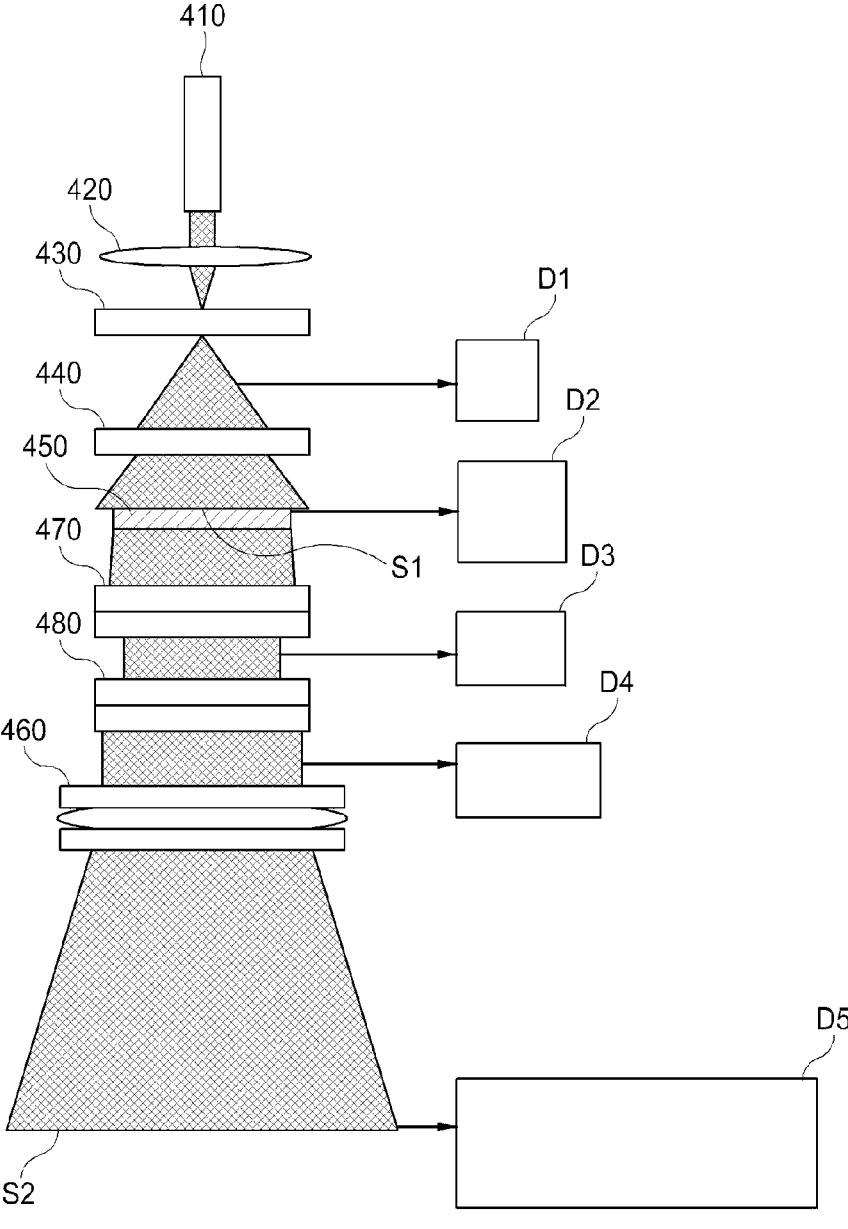

FIG. 9 is a block diagram of a laser optical system according to yet another embodiment of the present invention.

The optical system in FIG. 9 can be obtained by adding a mask to the optical system in FIG. 8 to trim the edge of the laser beam. A final surface light source D5 with a clearer edge can be obtained in FIG. 9 compared to FIG. 8.

Figure 10:
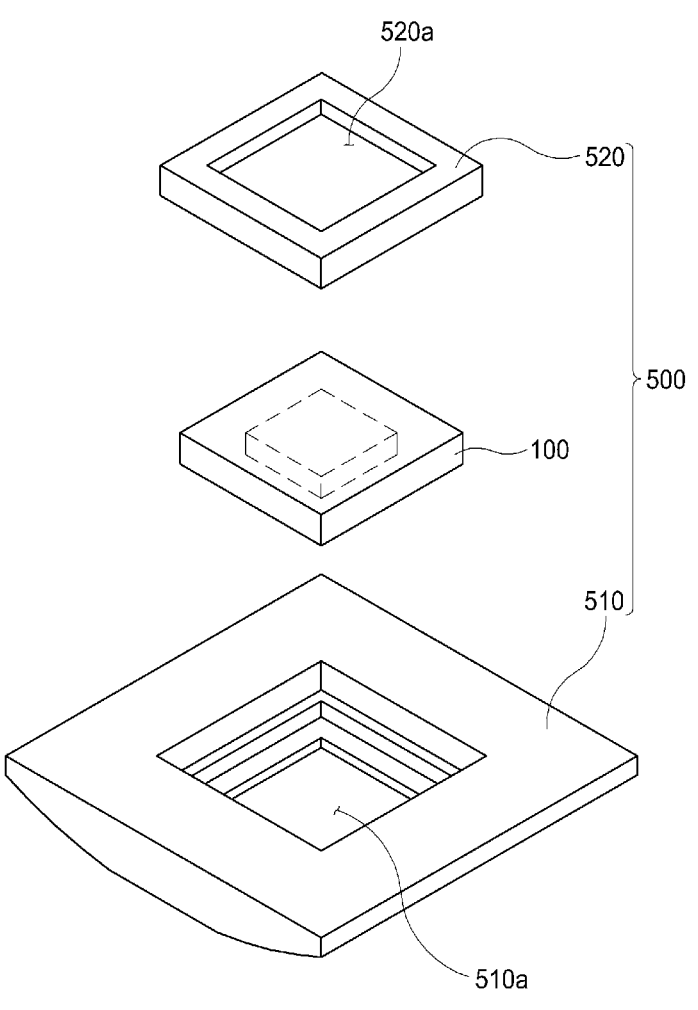
FIG. 10 is a perspective view showing the holder unit configuration of the laser pressurization head module according to some embodiment of the present invention.

FIG. 10 is a perspective view showing the holder unit configuration of the laser pressurization head module of the present invention.

Referring to FIG. 10, the holder unit 500, according to the present invention, is divided into a lower base plate 510 in which the lower part of the transmissive pressurization member 100 is settled and an upper mask plate 520 to which the upper part of the transmissive pressurization member 100 is coupled.

In addition, square perforations 510a and 520a are formed in the central portion of the base plate 510 and the mask plate 520, respectively. Since the transmissive pressurization member 1000 is settled on the base plate 510, the bottom surface 102 of the transmissive pressurization member 100 is exposed downwards through the perforation 510a of the base plate 51

As the mask plate 520 is fitted to the upper surface of the transmissive pressurizing member 100, the upper central portion of the transmissive pressurization member 100 is exposed upwards through the perforation 520a of the mask plate 520.

Figure 11:
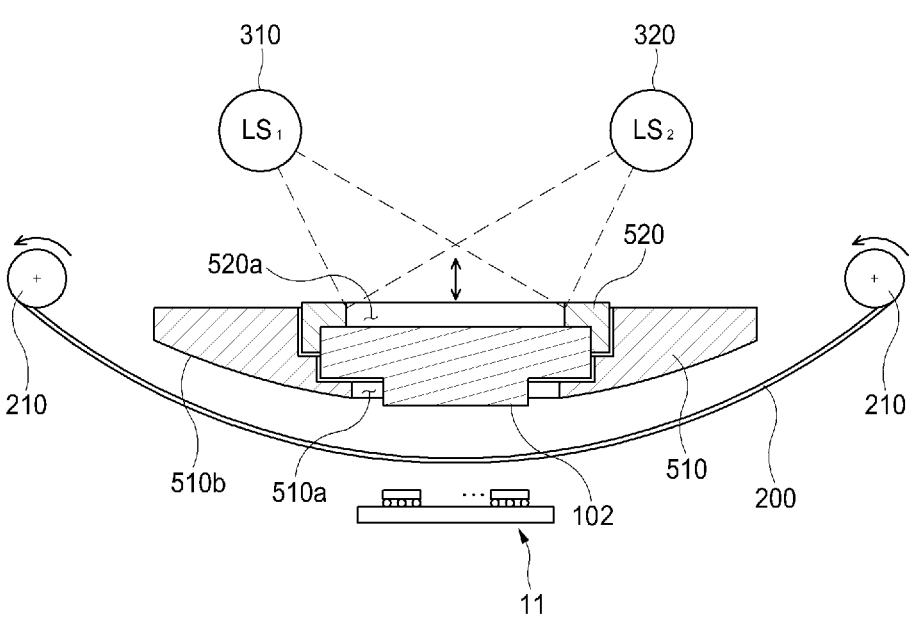
FIG. 11 is a cross-sectional view schematically showing the configuration and operation of the holder unit of the laser pressurization head module according to some embodiment of the present invention.

FIG. 11 is a cross-sectional view schematically showing the configuration and operation of the holder unit of the laser pressurization head module according to the present invention.

Referring to FIG. 11, when the laser is irradiated by the multi-beam laser modules 310, 320 located above while the transmissive pressurization member 100 is mounted between the base plate 510 and the mask plate 520, the laser beam is transmitted downwards through the upper perforation 520a of the mask plate 520 and the transmissive pressurization member 100.

The left and right sides of the bottom surface of the lower base plate 510 have a modestly rounded shape, which means that the protective film 200 would not be torn, scratched or damaged by the rounded edge of the base plate 510 when the protective film 200 located under the transmissive pressurization member 100 is pressed while the transmissive pressurization member 100 moves downwards.

In addition, the protective film 200 is pooled and wound by the protective film transporter 210 disposed on both sides of the protective film 200, as illustrated in FIG. 11. Since the bottom left and right surfaces of the base plate 510 are gently rounded, the protective film 200 can be fed without being damaged by the edge of the base plate 510.

The transmissive pressurization member 100 is irradiated by the laser beams from the multi-laser modules 310, 320 located upwards while simultaneously pressing down on the plurality of electronic components disposed on the substrate, i.e., the bonding object 11 at a certain depth. While the solder located at the bottom of the electronic component of the bonding object 11 is melted by the laser beam, a laser reflow proceeds.

As a result, the laser beams from the multi-laser modules overlap or superpose to form a homogenized laser beam. Uniform thermal energy is transferred through the perforation 520a of the mask plate 520, the transmissive pressurization member 100 and the perforation 520a of the base plate 510 to the solder located below the electronic component of the bonding object 11.

When the above-mentioned superposed laser beam is irradiated to the periphery of the substrate other than the electronic component, the peripheral substrate can be damaged by the thermal energy of the laser beam. Thus, it is necessary to design the size of the square perforation 520 of the mask plate 520 and the size of the pressurization area 102 of the transmissive pressurization member 100 carefully in consideration of the transmission path and superposition area of the laser beam to precisely press and reflow only the electronic component of the bonding object 11.

Figure 12:
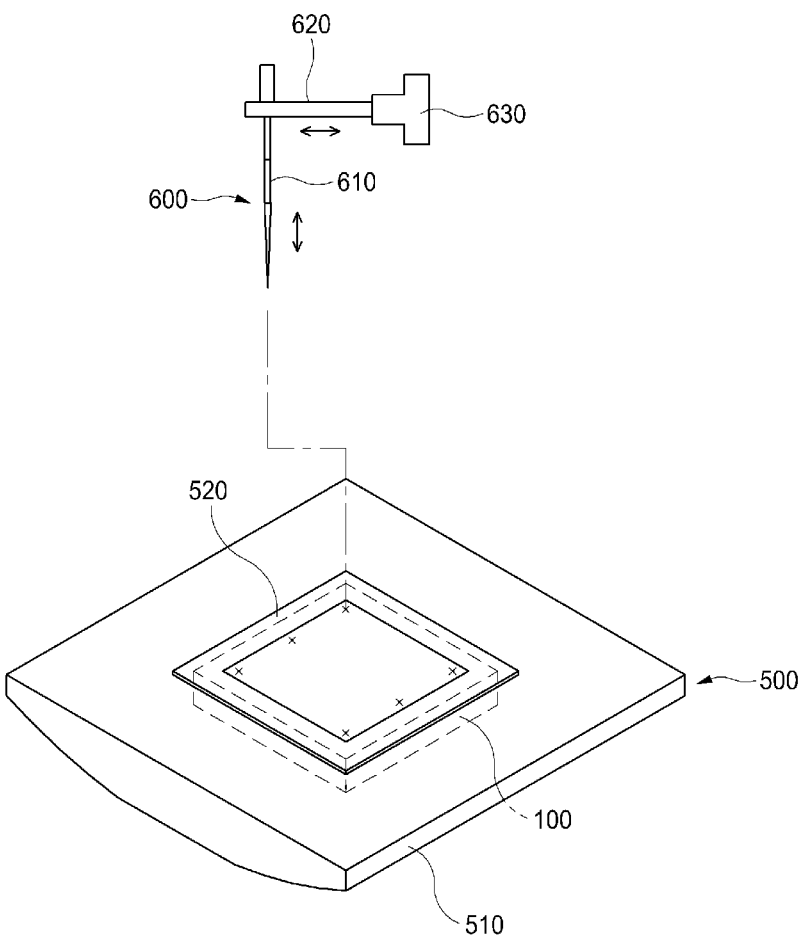
FIG. 12 is a perspective view showing the configuration and operation of the probe unit of the laser pressurization head module according to some embodiment of the present invention.

FIG. 12 is a perspective view showing the configuration and operation of the present invention's probe unit of the laser pressurization head module.

The present invention is primarily characterized by the interchangeability of the mask plate 520 and the transmissive pressurization member 100 to correspond to various substrate sizes. Different transmissive pressurization member 100 and mask plate 520 may be replaced according to the diverse arrangement and size of the electronic components on the substrate. The operator may select and replace the appropriate size of the transmissive pressurization member 100 and the mask plate 520 as needed. Then the flatness is measured by stabbing each corner of the upper surface of the transmissive pressurization member 100 using the probe unit 600 shown in FIG. 12.

The probe unit 600 may be composed of a needle-shaped probe 610, a probe transporter 620 for moving the probe horizontally or vertically, and a probe bracket 630 for supporting the probe 610 and the probe transporter 620.

Thus, when the operator replaces the transmissive pressurization member 100 and the mask plate 520 to process a different substrate, they may measure the flatness of the transmissive pressurization member 100 by moving the probe 610 horizontal and/or vertical direction and stabbing at least 4 points (indicated as "X") of the upper surface of the transmissive pressurization member 100.

Figure 13:
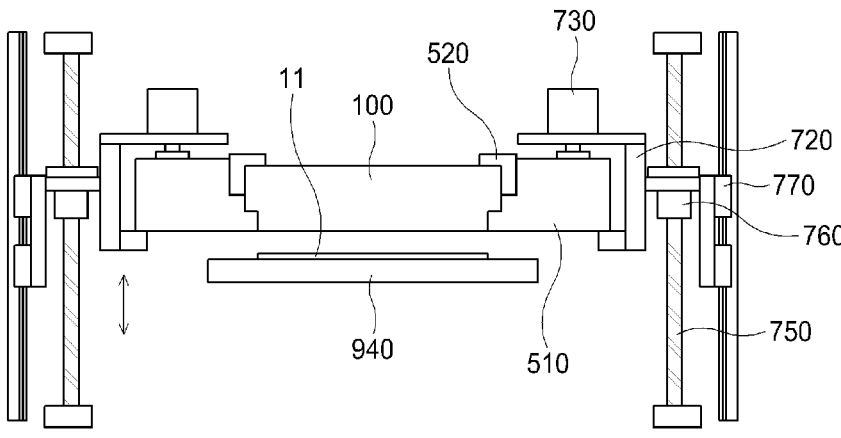
FIG. 13 is a cross-sectional view showing an overview of the vertical transport portion configuration and operating state of the laser pressurization head module according to some embodiment of the present invention.

FIG. 13 is a cross-sectional view showing the configuration and operation of the vertical transport system of the laser pressurization head module according to some embodiment of the present invention.

Referring to FIG. 13, the vertical transport system and its operation will be described in detail.

The vertical transport system comprises a pressing bracket 720 installed at each of four corners of the holder unit 500 containing the transmissive pressurization member 100, a pressurization cylinder 730 installed on top of the pressing bracket, and a vertical driving unit for applying a driving force to the pressing bracket 720 in a vertical direction. The vertical driving units include, for example, a ball screw 750 and a motor 760, and a guide member 770 for guiding the linear movement of the pressing bracket 720.

In operation, the transmissive pressurization member 100 and the holder unit 500 are transported upwards by driving the motor 760 of the vertical transport system. Then they are transported downwards by driving the motor 760 in the opposite direction after the bonding object 11, consisting of the substrate and electronic components, is inserted. After that, the transmissive pressurization member 100 presses the bonding object 11 vacuum-absorbed onto the electrostatic chuck 940 (in FIG. 26A) by the pressurization cylinder 730.

Figure 15:
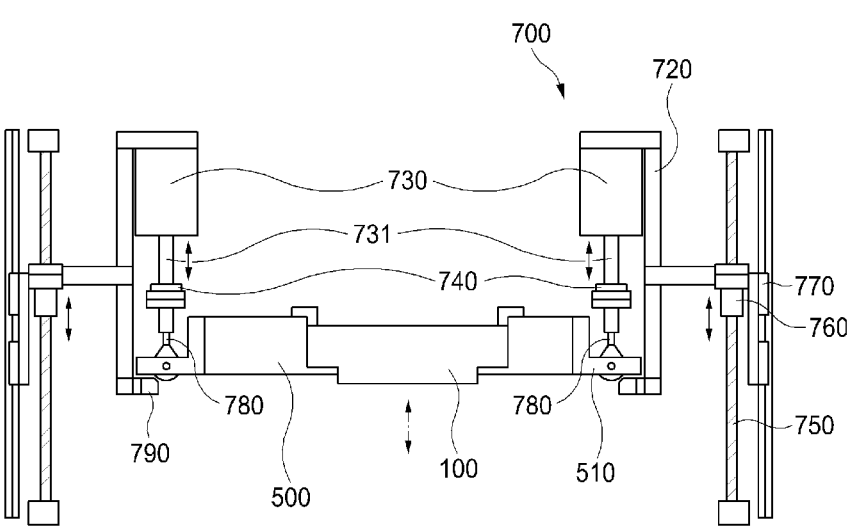
FIG. 15 is a cross-sectional view of the vertical transport system in FIG. 14.
Figure 26A:
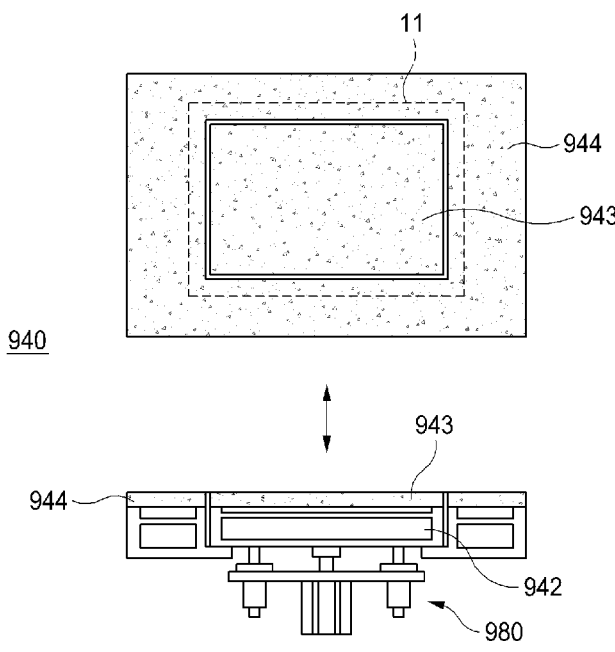
FIGS. 26A and 26B show exemplary views illustrating the configuration and operation of the vacuum chuck of the bonding object transfer module according to some embodiments of the present invention.

Referring to FIGS. 15 and 26*a*, a heating block 942 for preheating the bonding object 11 to a predetermined temperature is installed at the bottom of the electrostatic chuck 940, and the bonding object 11 is continuously preheated while the bonding object 11 is transported for laser reflow treatment while the bonding object 11 is seated on the electrostatic chuck 940. For example, the temperature to which the bonding object 11 is preheated may be less than 200° C. It is preferable to set the preheat temperature to a range so thermal damage may not be applied to the substrate.

Referring back to FIG. 12, when the probe unit 600 measures the flatness of the transmissive pressurization member 100 and determines that the transmissive pressurization member 100 is tilted to either side, that is, when it is not in a balanced state, the vertical transport system is finely driven to adjust the flatness of the transmissive pressurization member 100 by transporting the holder unit 500 upwards or downwards.

In more detail, as a result of the flatness measurement of the transmissive pressurization member 100 by the probe unit 600, when it is determined that one of the upper four corners of the transmissive pressurization member 100 is located at a lower point than the others, for example, the motor 760 of the corner at the lower end is operated to adjust the overall flatness of the transmissive pressurization member 100 by finely lifting the corner of the holder unit 500 upwards.

Using an absolute value encoder, the motor 760 may consistently maintain the absolute position or height value of each corner portion of the holder unit 500 regardless of the power state. Preferably, the flatness adjustment process of the transmissive pressurization member 100 described above is automated through a controller setting.

Figure 14:
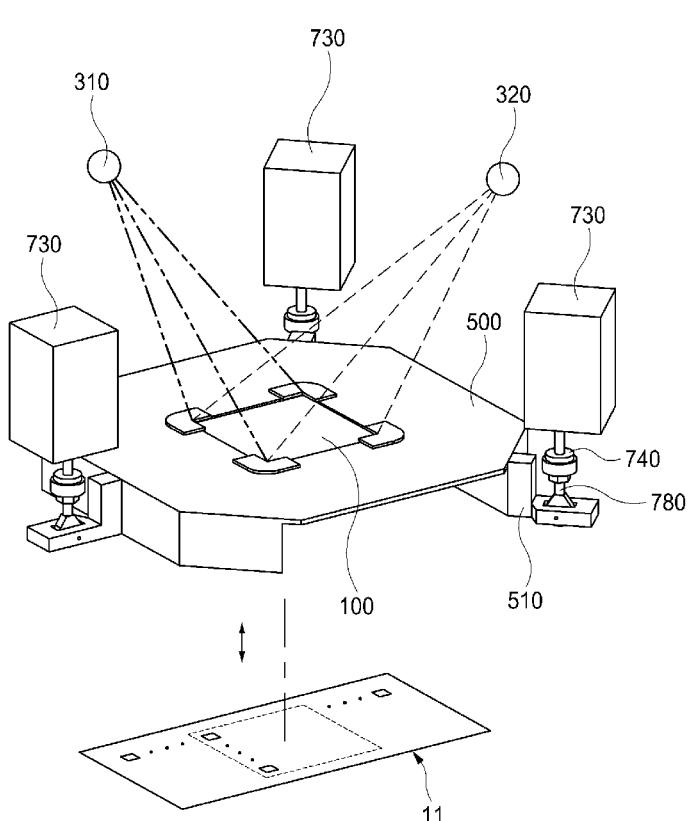
FIG. 14 is a perspective view showing the vertical transport system of the laser pressurization head module according to some embodiment of the present invention.

FIG. 14 is a perspective view showing the vertical transport system of the laser pressurization head module according to some embodiment of the present invention. FIG. 15 is a cross-sectional view of the vertical transport system in FIG. 14.

The detailed configuration of the laser pressurization head module of the present invention and its operation according to the pressurization and laser beam irradiation will be described regarding the embodiment in FIGS. 14 and 15.

The pressurization head of the present invention includes a transmissive pressurization member 100 for transmitting the irradiated laser beam from the laser sources 310, 320 while pressing down the electronic component that is the bonding object 11. The transmissive pressurization member 100 is replaceably inserted into the perforation formed in the center of the planar-shaped holder unit 500.

While the holder unit 500 may be formed to have a circular or polygonal shape (see FIGS. 16A, 16B), the holder unit 500 in FIGS. 14 and 15 has an octagonal shape.

Figure 16A:
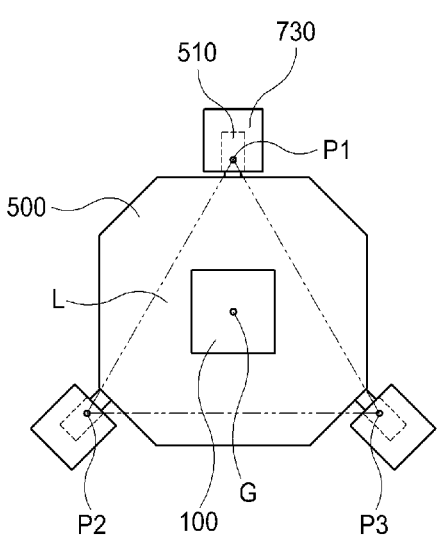
FIG. 16A is a plan view of an octagonal-shaped holder unit of the laser pressurization head module according to some embodiment of the present invention.
Figure 16B:
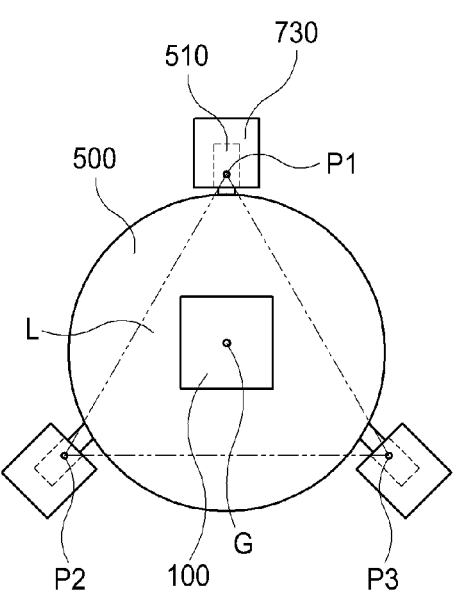
FIG. 16B is a plan view of the holder unit of the laser pressurization head module of the present invention having a circular shape according to another embodiment.

In FIGS. 16A and 16B, the three points P1, P2, and P3 in the periphery of the octagonal-shaped holder unit 500 are axially coupled to the press unit 700, wherein the vertical line L links the three points forming a triangle.

The virtual triangle connecting the three points of the holder unit 500 may be equilateral, preferably matching the center of gravity G of the virtual triangle with the center of gravity G of the transmissive pressurization member 100.

It is impossible to make a stable triangular structure with two points axially coupled to the press unit 700 since one cannot make an area with the line linking two points. It is better to design the three axially coupled points P1, P2, P3 around the rim of the holder unit 500. To construct a stable axis coupling point of a virtual triangle while minimizing the number of axial coupling points that require flatness control, the holder unit 500 has three axial coupling points P1, P2, P3, constructed precisely symmetrically.

Referring to FIG. 15, the press unit 700 comprises a pressing bracket 720 having a certain height and shape, a pressurization cylinder 730 mounted at the pressing bracket and presses the holder unit 500 downwards by a set pressure, and a bearing joint 780 in which one end is coupled to the cylinder rod 731 of the pressurization cylinder 730 and the other end is rotatably coupled to one of the three axial coupling points P1, P2, and P3 of the holder unit 500. The pressurization cylinder 730 may adopt a precision pneumatic cylinder capable of finely setting and controlling the pressure in kgf units.

The end of the cylinder rod 731 of each pressurization cylinder 730 is further provided with a pressure sensor 740.

For example, the pressure sensor 740 may be implemented as a load cell. When the cylinder rod 731 of each pressurization cylinder 730 is extended to press each axis coupling point of the holder unit 500, the press sensor 740 measures the pressure to check any over-pressure and feeds it back to the control unit (not shown).

A joint coupler 510 is provided to each of the three axial coupling points of the holder unit 500, and each joint couple 510 is rotatably coupled to the bearing joint 780.

Accordingly, as the cylinder rod 731 of the pressurization cylinder 730 is extended or retracted, the bearing joint 780 pivoted to an end of the cylinder rod 731 is also moved in a vertical direction, and the holder unit 500 and the joint coupler 510 rotatably coupled to the bearing joint 780 are also moved together.

Therefore, the holder unit 500 can be driven inclined by differently controlling the extending or retracting length of the cylinder rod 731 of each pressurization cylinder 730. Accordingly, the pressure can be precisely controlled even by controlling the contact height of the holder unit 500.

In addition, the end of the joint coupler 510 is seated on the stopper 790 provided at the bottom of the pressing bracket 720, thereby offsetting the self-weight of the holder unit 500 acting downwards and thus playing a role in maintaining flatness when vertically transporting the holder unit 500.

In addition, a vertical transporting system for raising and lowering the pressing bracket 720 in a vertical direction is further provided on the side of the pressing bracket 720.

The vertical transport system comprises a pressing bracket 720 installed at each of four corners of the holder unit 500 containing the transmissive pressurization member 100, a pressurization cylinder 730 installed on top of the pressing bracket, a ball screw 750 and a motor 760 for applying a driving force to the pressing bracket 720 in a vertical direction, and a guide member 770 for guiding the linear movement of the pressing bracket 720.

In operation, when the holder unit 500 moves downwards, the transmissive pressurization member 100 mounted on the holder unit 500 is transported downwards to press the bonding object 11.

In addition, since the flatness of the holder unit 500 may be varied by vibration generated during the reflow process or vibration caused by the replacement of the transmissive pressurization member 100, it is preferable to set the flatness again by initializing it to zero after replacing the transmissive pressurization member 100 or periodically.

FIG. 16A is a plan view of an octagonal-shaped holder unit of the laser pressurization head module according to some embodiment of the present invention.

First, the shape of the holder unit may be a polygon, and it may be a triangular shape connecting the three axial coupling points P1, P2, P3. More specifically, for geometric symmetry, an equilateral triangle could be obtained by equally forming the length of the imaginary line connecting the center of gravity G. and each of the three axial coupling points P1, P2, P3.

In addition, in FIG. 16A, since a rectangular transmissive pressurization member 100 should be seated and accommodated inside the polygonal holder unit 500, the holder unit 500 has a larger area than that of the transmissive pressurization member 100. In FIG. 16A, the rectangular transmissive pressurization member is sufficiently accommodated in the octagonal holder unit 500.

The holder unit 100 of the present invention is not limited to the octagonal shape shown in FIG. 16A and may include various polygon shapes, such as triangles, squares and octagons.

On the other hand, FIG. 16B is a plan view of the holder unit of the laser pressurization head module of the present invention having a circular shape according to another embodiment.

In addition, the shape of the holder unit of the present invention may be polygonal and may also be formed in a circle according to other embodiments.

Therefore, even when the holder unit is formed in a circular shape, as shown in FIG. 16B, a geometric symmetry could be obtained by equally forming the length of the imaginary line connecting the center of gravity G and each of the three axial coupling points P1, P2, P3. It is possible to precisely control to pressurize each axial bonding point while maintaining a high flatness using only the minimum three axial coupling points P1, P2, P3.

Therefore, as discussed above, the pressurization head of the present invention can perform a reflow treatment at once by pressing all the plurality of electronic components 11 using a transmissive pressurization member simultaneously with irradiating the laser beam. Thus, the precision and productivity can be significantly improved compared to the conventional method of raising a small transmissive pressurization member for each electronic component and pressing it with the self-weight of the transmissive pressurization member.

In addition, the pressurization cylinder 730 can be precisely controlled by adopting a precision pneumatic cylinder capable of finely setting and controlling the pressure in kgf units. The operator can control the set pressure of the pressurization cylinder 730 differently according to various factors such as the curved state of the FPCB substrate, thereby facilitating the pressure balance applied to the bonding object 11 disposed below the large-area transmissive pressurization member 100 of the present invention as compared to the conventional one.

On the other hand, when a pressure above the set pressure is applied to each pressurization cylinder 730, the pressure sensor 740 coupled to the end of the cylinder rod 731 of the pressurization cylinder 730 senses it and feeds it back to the control unit (not shown).

Therefore, when more than a certain amount of pressure is detected, the controller performs an auto-balancing process for adjusting the pressure to a set value or generates an alarm so that the operator can manually adjust the set pressure of each of the pressurization cylinders 730 as needed.

In addition, although not shown in FIGS. 14 to 16A and 16B, the holder unit 500, the transmissive pressurization member 100 and the press unit 700 may be installed in the transmissive pressurization member transporter 140 and the support 150, as described in FIG. 2. For example, the transmissive pressurization member transporter 140 may be implemented as vertically transportable in the up-and-down direction by a vertical transporter (e.g., a motor and a ball screw device). The support 150 may be implemented, for example, as a gentry device.

In operation, the transmissive pressurization member 100, the holder unit 500 and the press unit 700 are transported upwards so that the bonding object 11 may be inserted into the position directly below the transmissive pressurization member 100. Then they are transported downwards to a place near the bonding object 11 to hold on standby for the pressurization on the bonding object 11.

Figure 17A:
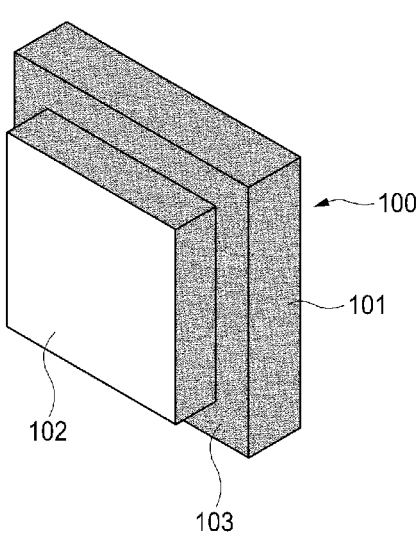
FIGS. 17A and 17B are perspective views showing a transmissive pressurization member of a laser pressurization head module according to some embodiments of the present invention.
Figure 17B:
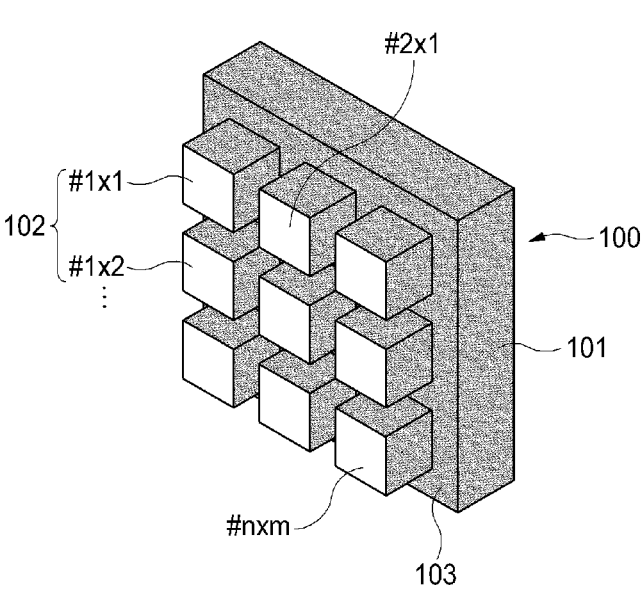

FIGS. 17A and 17B show the transmissive pressurization member 100 according to some embodiment of the present invention. FIG. 17A illustrates a transmissive pressurization member 100 with a single pressurization area 10 in bulk type. FIG. 17B shows the transmissive pressurization member 100 with a split pressurization area 100 divided into several segmented pressurization areas corresponding to each electronic component on the bonding object 11.

In FIG. 17A, the transmissive pressurization member 100 has a structure in which a bulky pressurization area 102 protrudes on the square-shaped substrate 101. It is preferable that the area of the pressurization area 102 is designed to correspond to the processing area of the bonding object 11 to be subjected to the laser reflow process at one time.

The area of the pressurization area 102 is formed to be narrower than the area of the substrate 101. There is at least one indented step 101a around the periphery of the pressurization area 102. In addition, except for the pressurization area 102, a laser beam blocking layer 103 (shaded in FIG. 17A) is further formed on the sides of the substrate and bottom and sides of the indented step 101a to prevent leakage of the laser beam.

FIG. 17B shows another embodiment of the laser pressurization head module wherein the transmissive pressurization member 100 has a split pressurization area divided into a plurality of segmented pressurization areas 102 corresponding to each of the plurality of electronic components in the bonding object 11. For this purpose, the segmented pressurization areas 102 need to be designed and processed to accurately correspond to the surface area of each electronic component to be laser reflowed.

As shown in FIG. 17B, a laser beam blocking layer 103 is further formed on the sides of the substrate 101 and the bottom and sides of the step 101a, except the plurality of the segmented pressurization areas 102 divided in the form of a grid.

The laser beam blocking layer 103 may generally form various types of special coating layers that absorb or reflect light. For example, it may be formed as an Inconel coating layer that absorbs the laser beam, a diffuse reflection layer in the form of frosted glass, a high reflection (HR) coating layer that reflects the laser beam or any combination thereof. By coating the laser beam blocking layer 103, the laser beam may be irradiated through the pressurization area 102 of the transmissive pressurization member 100 only to the electronic components of the bonding object 11. The thermal damage of the peripheral substrate (PCB) portion near the electronic components is also prevented.

Figure 18:
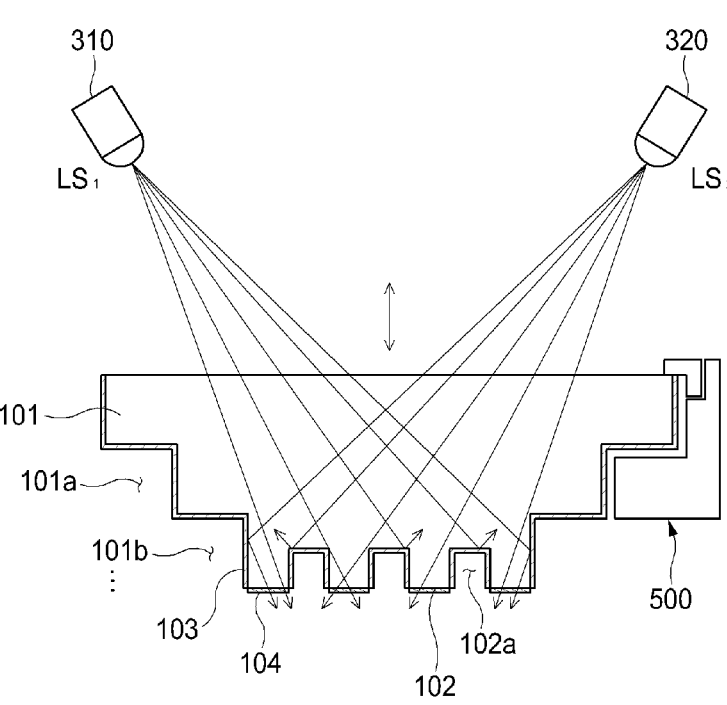
FIG. 18 show a transmissive pressurization member mounted on a pressurization head according to some embodiment of the present invention.
Figure 19:
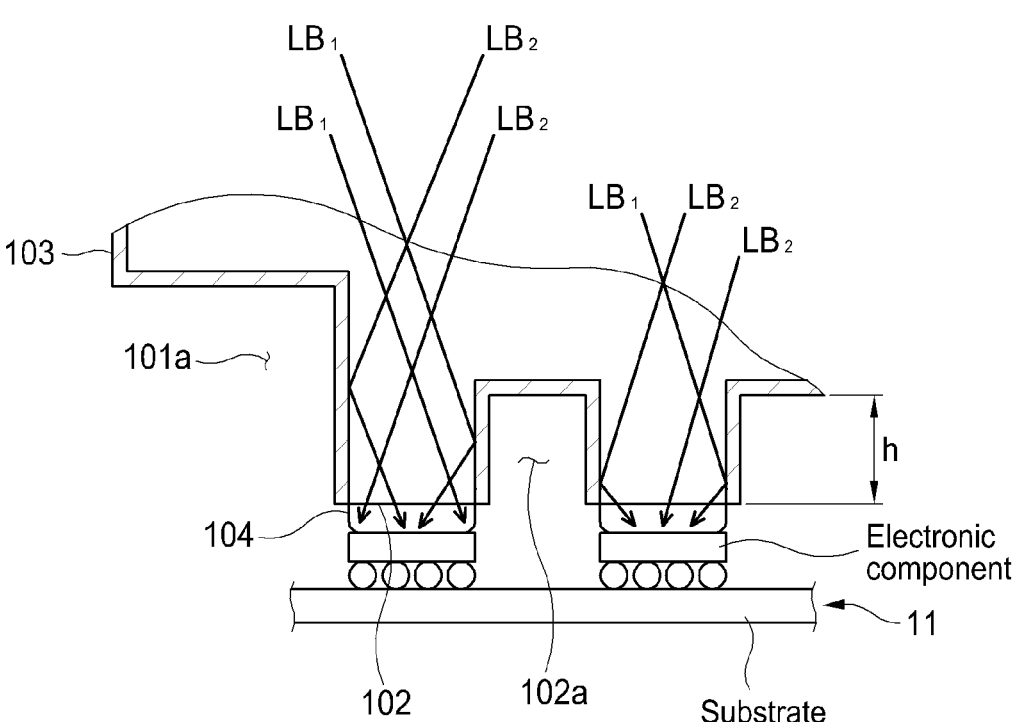
FIG. 19 is a partially enlarged view of FIG. 18.

FIG. 18 shows a transmissive pressurization member mounted on a pressurization head, and FIG. 19 is a partially enlarged view of FIG. 18.

Referring to FIGS. 18 and 19, the transmissive pressurization member 100 has segmented pressurization areas 102 is protruding on the bottom surface of the rectangular substrate 101, each having a size smaller than the area of the substrate as previously discussed. Between the substrate 101 and the pressurization area 102, at least one indented step 101a is formed. As shown in FIG. 15, step 101a is used to mount the transmissive pressurization member 100 onto the holder unit 500 of the laser reflow apparatus.

A silicon damper layer 104 may be further formed on each segmented pressurisation area 102. In general, the height of the electronic components disposed on the printed circuit board (PCB) constituting the bonding object 11 are not entirely flat or equal due to the nature of the flexible circuit board and have their bends or curves. Accordingly, each electronic component may be understood to be disposed of at a different height along the curved surface of the flexible circuit board.

When the pressurization area 102 of the transmissive pressurization member 100 presses the electronic components located at different heights in the curved surface of the flexible circuit board at a time, the electronic components positioned in the relatively higher position are subjected to more significant pressure than those placed in the lower position, thereby causing the solder located beneath the electronic components arranged in the higher position to suffer abnormal reflow due to excessive pressurization, which may lead to poor bonding.

By forming a silicon damper layer 104 made of a transmissive elastic mater on the pressurization area 102, according to some embodiment of the present invention, the silicon damper layer 104 performs a damping function for absorbing the excessive pressure acting on the electronic components located in the higher position.

When the transmissive pressurization member 100 presses the electronic component and the first or second laser modules 310, 320 irradiate a laser beam, the laser beam is illuminated through the transmissive pressurization member 100 to the electronic component and transfers thermal energy for reflow treatment.

Referring to FIG. 19, since a laser beam blocking layer 103 is formed on the side surfaces of the substrate 101 and the bottom and side surfaces of the indented step 101a when the laser beam is irradiated through the transmissive pressurization member 100, the laser beam is blocked from leaking into other parts than the targeted, segmented pressurization area 102.

In addition, for uniform laser reflow treatment, the shape and protruding height of the segmented pressurization area 102 are also considered significant issues in the design of the transmissive pressurization member 100. For example, unlike the pressurization area 102 in a square shape, as shown in FIG. 17A, if the pressurization face 102 is formed in a rectangular structure, it can be predicted that the thermal energy by the laser beam will be lost more rapidly toward a longer side since the lateral surface area of the longer side is larger than that of the shorter side.

When the above-explained heat loss occurs, the thermal energy cannot be uniformly transferred to the plurality of electronic components disposed under the pressurization area 102, so the electronic components suffering lower or higher temperature than an appropriate bonding temperature are more likely to experience a bonding failure. According to the preferred embodiment, the bottom shape of the pressurization area 102 is designed in a square structure and the heat loss through the side surfaces of the pressurization area 102 is uniformly carried out in the four lateral directions.

In FIG. 19, if the protrusion height h of the pressurization area 102 is too high, there is a possibility that too much heat loss through the side surfaces of step 101a may occur. It is preferable to minimize the protrusion height h of the pressurization area 102 or the depth of the lattice groove 102a between the segmented pressurization areas 102 to a few millimeters.

Figure 20A:
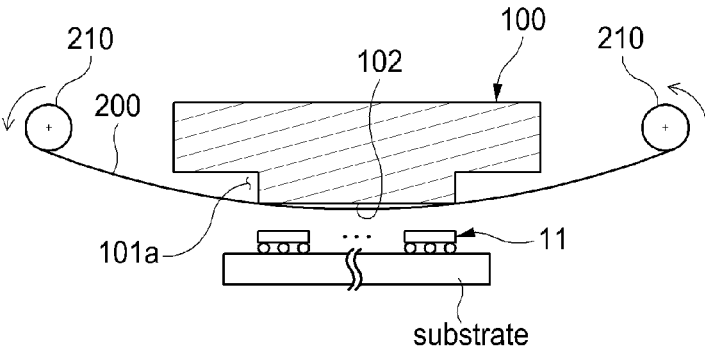
FIGS. 20A to 20C are schematic diagrams illustrating various embodiments of a transmissive pressurization member according to some embodiments of the present invention.
Figure 20B:
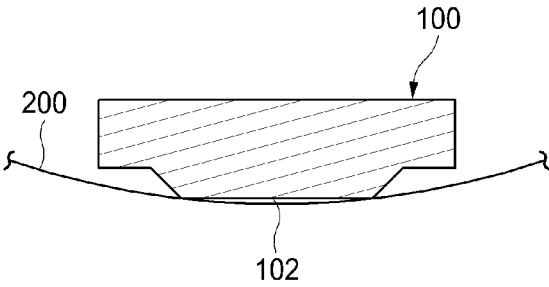
Figure 20C:
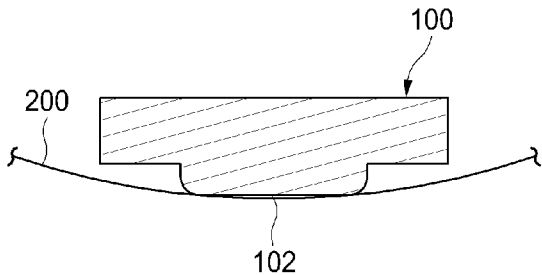

On the other hand, FIGS. 20A to 20C are schematic diagrams illustrating various embodiments of the transmissive pressurization members according to the present invention. FIG. 20A shows a case where edges of the pressurization area are not treated, while FIG. 20B shows another case where the edges of the pressurization area are chamfered, and FIG. 20C shows another case where the edges of the pressurization area are rounded.

Referring to FIGS. 20A, 20B, and 20C, as described above regarding FIG. 2, a protective film 200 is provided beneath the bottom of the transmissive pressurization member 100 of the present invention to prevent absorption of fumes. In FIG. 20A, when the transmissive pressurization member 100 is moved downwards and the bonding object 11 is under pressure, the protective film 200 is also pressed together by the transmissive pressurization member 100 so that the protective film 200 contacts both edges of the pressurization area 102.

However, if the protective film 200 repeatedly contacts both sharp edges of the pressurization area 102, it will eventually be torn or damaged.

Therefore, to prevent such a problem, the present invention provides additional consideration in designing the transmissive pressurization member 100 by chamfering both edges of the pressurization area 102, as shown in FIG. 20B or rounding both edges as shown in FIG. 20C, so that the protective film is not damaged by both edges of the pressurization area 102.

Figure 21:
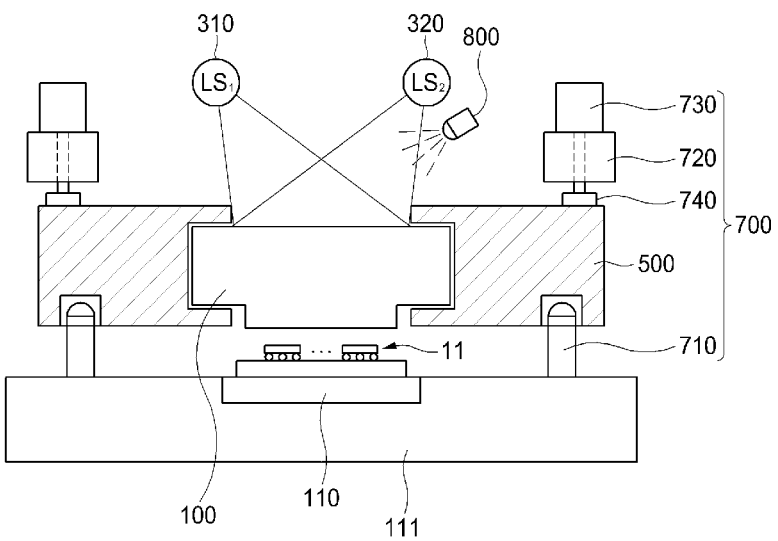
FIG. 21 is a lateral cross-sectional view showing the overall configuration of the laser pressurization head module according to the embodiment of FIG. 13.
Figure 22:
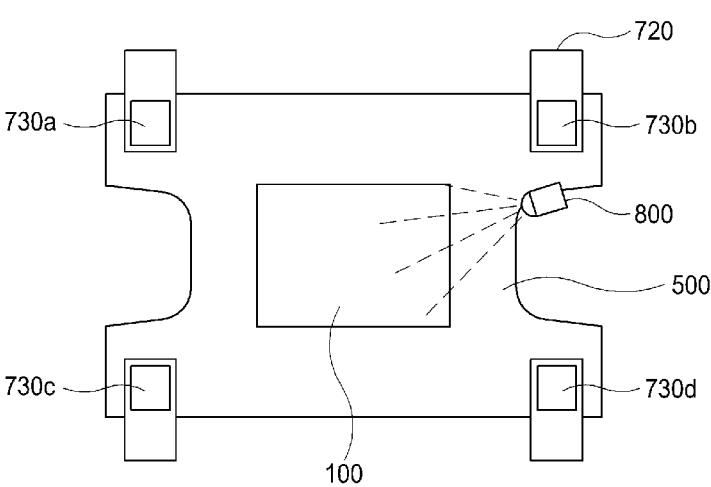
FIG. 22 is a plan view of the laser pressurization head module in FIG. 21
Figure 23:
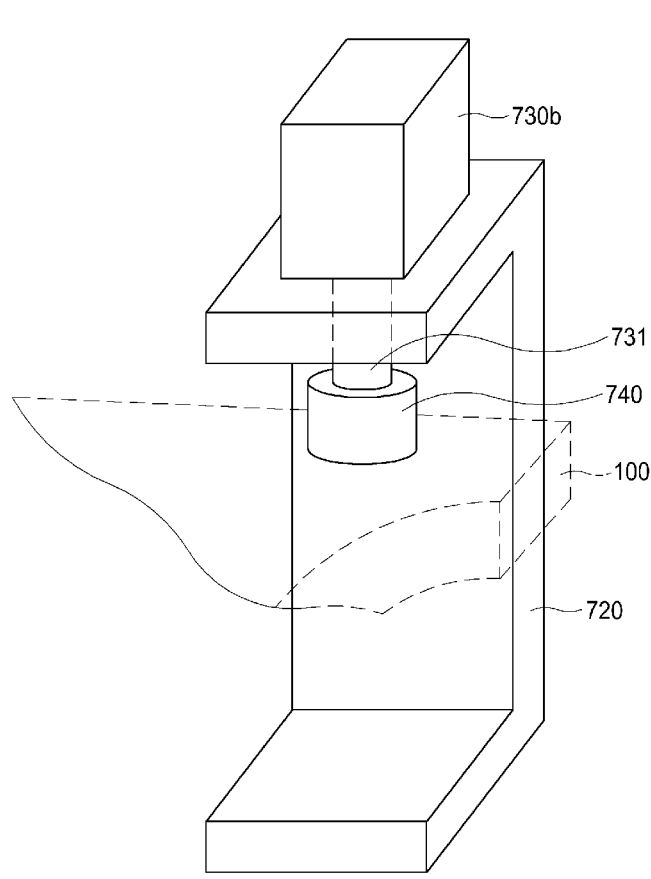
FIG. 23 is an enlarged perspective view of the press unit of the laser pressurization head module according to the embodiment of FIG. 13

From now on, FIG. 21 is a lateral cross-sectional view illustrating the overall configuration of the laser pressurization head module according to the embodiment of FIG. 13. FIG. 22 is a plan view of the laser pressurization head module in FIG. 21. FIG. 23 is an enlarged perspective view of the press unit of the laser pressurization head module according to the embodiment of FIG. 13.

The detailed configuration and operation of the laser pressurization head module of the present invention will be explained.

Referring to FIGS. 21 and 22, the transmissive pressurization head of the present invention includes a transmissive pressurization member 100 for transmitting the laser beam irradiated from the laser modules 310, 320 while pressurizing the electronic components of the bonding object 11. The transmissive pressurization member 100 is mounted on the center perforation of the planar shaped holder unit 500. Accordingly, when the holder unit 500 is moved downwards, the transmissive pressurization member 100 mounted on the holder unit 500 is also moved downwards to press the bonding object 11, including the electronic components.

Each corner portion of the holder unit 500 is located adjacent to the press unit 700 in a non-contact state. The bottom of the holder unit 500 is supported by a pressure balancer 710, which is a component that serves as a buffer for offsetting the self-weights of the transmissive pressurization member 100 and the holder unit 500 by pressing them in the reverse direction. The pressure balancer 710 may be implemented, for example, by an air cylinder or an elastic spring.

If the self-weight of the transmissive pressurization member 100 and the holder unit 500 is offset by the pressure balancer 710 to a value of zero, then the transmissive pressurization member 100 is queued for pressurization.

Referring to FIG. 23, the press unit 700 further includes a pressing bracket 720 having a "[" shape to wrap the corner of the holder unit 500 in a non-contact state, and a pressurization cylinder 730a, 730b, 730c, 730d fixed, respectively at the top of the pressing bracket 720, and pressure sensor 740 installed at the end of the cylinder rod of the pressurization cylinder 730a, 730b, 730c, 730d.

For example, the pressure sensor 740 may be implemented by a load cell. When the cylinder rods of the pressurization cylinders 730a, 730b, 730c, 730d are extended to press each corner of the holder unit 500, the pressure sensor 740 continuously measures the pressure to check whether the pressure is above the appropriate pressure value and feed it back.

Therefore, as discussed above, the transmissive pressurization head of the present invention can perform a reflow treatment at once by pressing all the plurality of electronic components 11 using a transmissive pressurization member simultaneously with irradiating the laser beam. Thus, the precision and productivity can be significantly improved compared to the conventional method of raising a small transmissive pressurization member for each electronic component and pressing it with the self-weight of the transmissive pressurization member.

A pressurization cylinder 730a, 730b, 730c, 730d is installed at each corner of the holder unit 500 to set the pressure independently and form a pressing mechanism for large areas. In addition, the pressurization cylinders 730a, 730b, 730c, 730d can be precisely controlled by adopting a precision pneumatic cylinder capable of finely setting and controlling the pressure in Kgf units. The operator can control the set pressure of the pressurization cylinder 730 differently according to various factors such as the curved state of the PCB substrate, thereby facilitating the pressure balance applied to the bonding object 11 disposed below the large-area transmissive pressurization member 100 of the present invention as compared to the conventional one.

On the other hand, when a pressure above the set pressure is applied to each pressurization cylinder 730a, 730b, 730c, 730d, the pressure sensor 740 coupled to the end of the cylinder rod 731 of the pressurization cylinder 730a, 730b, 730c, 730d senses it and feed it back to the control unit (not shown). Therefore, when more than a certain amount of pressure is detected, the controller performs an auto-balancing process for adjusting the pressure to a set value or generates an alarm so that the operator can manually adjust the set pressure of each of the pressurization cylinders 730a, 730b, 730c, 730d as needed.

In addition, although not shown in FIGS. 21 to 23, the holder unit 500, the transmissive pressurization member 100 and the press unit 700 may be installed in the transmissive pressurization member transporter 140 and the support 150 as described in FIG. 2. For example, the transmissive pressurization member transporter 140 may be implemented as vertically transportable in the up-and-down direction by a vertical transporter (e.g., a motor and a ball screw device). The support 150 may be implemented, for example, as a gentry device.

In operation, when the bonding object 11, including the electronic components and the substrate, is inserted, the transmissive pressurization member 100, the holder unit 500 and the press unit 700 are transported upwards so that the bonding object 11 may be inserted into the position directly below the transmissive pressurization member 100. Then they are transported downwards to a place near the bonding object 11 to hold on standby for the pressurization on the bonding object 11.

Referring to FIGS. 21 and 22, wherein the laser pressurization head module further comprises an ionizer 800 for cleaning the upper surface of the transmissive pressurization member from dust. The ionizer 800 may be placed above the holder unit 500. The transmissive pressurization member 100 may be implemented by quartz, for example. Some particles may be settled and accumulated even when the reflow process is carried out in a cleanroom environment. Such damage as the burning of the particles may be inflicted by repeated irradiation of laser beams.

As a result, when the burning of the above particles is repeated for a long time, the upper surface of the transmissive pressurization member 100 becomes more and more discoloured, and a breakage such as a crack may occur in the transmissive pressurization member 100. Thus, the ionizer 800 needs to prevent absorption of the particles by prohibiting the generation of static electricity on the upper surface of the transmissive pressurization member 100.

Figure 24:
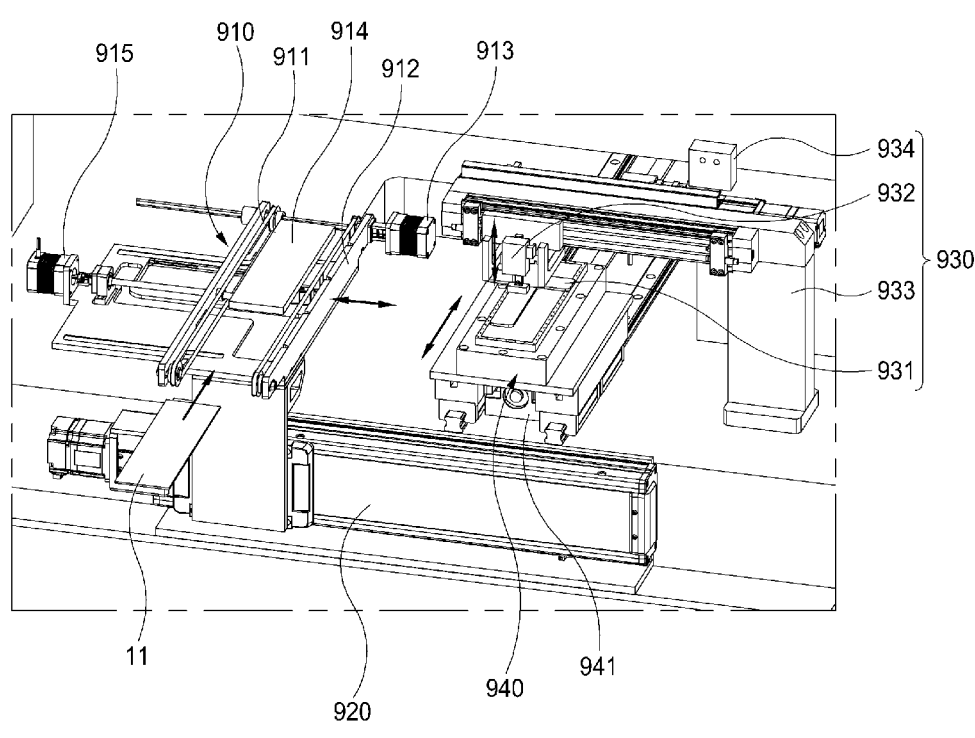
FIG. 24 is a perspective view showing the configuration and operation of the input region of the bonding object transfer module according to some embodiment of the present invention.

FIG. 24 is a perspective view showing the configuration and operation of the input region of the bonding object transfer module according to some embodiment of the present invention. According to some embodiment of the present invention, the mechanical configuration and operation of the bonding object transfer module's input region (i.e., import area) are explained below in FIG. 24.

In the input region, an input conveyor 910 is provided for loading a bonding object (e.g., a plurality of electronic components seated on the PCB) for laser reflow processing. The input conveyor 910 comprises conveyor frame 912 having a bent shape of "¬" character, and a pair of wire caterpillars 911 installed on the upper sides of the conveyor frame 912 for transporting the bonding object 11. The wire caterpillars 911 are coupled to the axis of rotation of the caterpillar drive motor 913. In addition, on one side of the conveyor frame 912, there is a width adjustment motor 915 for increasing or decreasing the width of the input conveyor 910 to accommodate the bonding object 11 of different sizes.

In addition, a horizontal transporter 920 is mounted on one end of the conveyor frame 912. The conveyor frame 912 is transported horizontally as the horizontal transporter 920 moves.

A preheating stage 914 is provided above the conveyor frame 912. The bonding object 11 stays above the preheating stage 914 to be preheated to a predetermined temperature (e.g., 150° C.) before being transported into the laser reflow treatment area by the wire caterpillar 911. With the continuous preheating of the bonding object 11, the operation temperature may rise quickly and stably to a melting temperature (e.g., 250° C.) of solder by the irradiation of laser beams in the laser reflow process.

For the input conveyor 910 to be moved horizontally and fed into the reflow treatment area while being preheated on the preheating stage 914, the bonding object 11 must be accurately delivered on the vacuum chuck 940 without being twisted. Referring to FIG. 21, a picker unit 930 is provided above the vacuum chuck 940. The picker unit 930 comprises a vacuum absorption pad 931 for absorbing the bonding object 11, a cylinder 932 for driving the vacuum absorption pad in a vertical direction, and a support frame 933 for fixing the vacuum absorption pad 931 and the cylinder 932.

When the input conveyor 910 moves towards the vacuum chuck 940, the vacuum absorption pad 931 of the picker unit 930 moves upwards by driving the cylinder 932. When the bonding object 11 is then seated below the vacuum absorption pad 931, the vacuum absorption pad 931 moves downwards to absorb the bonding object 11 and then moves back upwards. After that, when the input conveyor 910 moves horizontally back to its original position and exits from the bottom of the vacuum absorption pad 931, the vacuum absorption pad 931 moves downwards again to repeat the operation of placing the bonding object 11 on the vacuum chuck 940.

After that, since a horizontal transporter such as linear motor 941 is provided under the vacuum chuck 940, the vacuum chuck 940 and the bonding object 11 move together to a laser reflow processing area by operating the linear motor 941.

In addition, a vision unit 934 is provided at one side of the vacuum chuck 940 to monitor the loading state constantly, for example, whether the bonding object 11 has been correctly seated and aligned on the vacuum chuck 940 in the input region.

Figure 25:
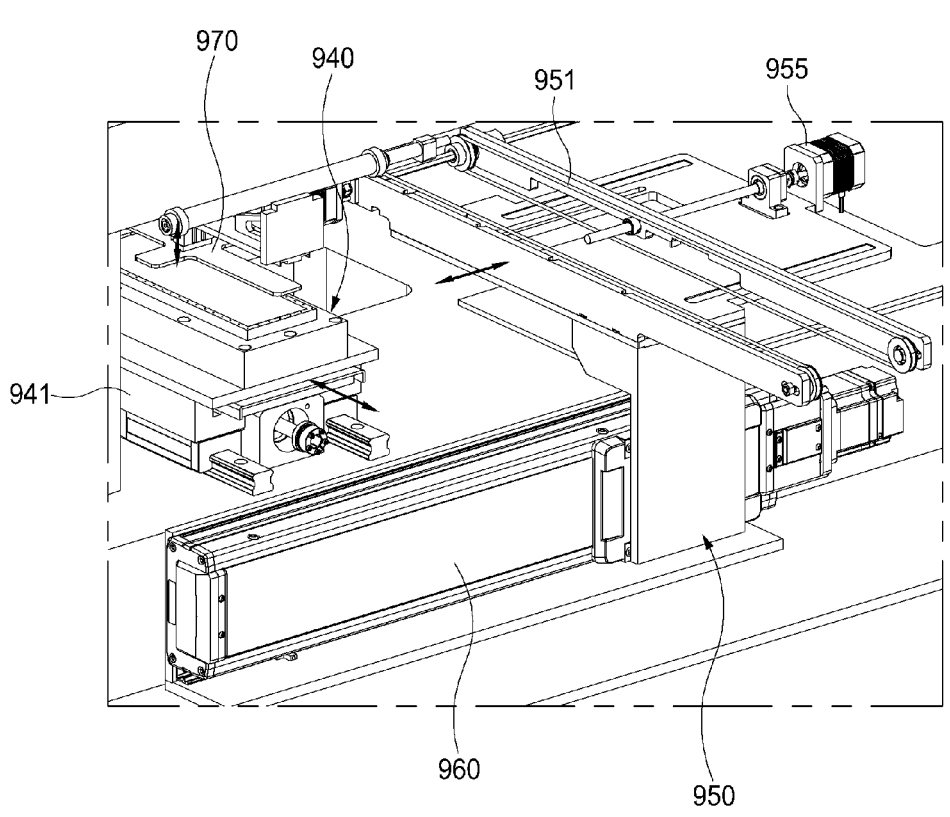
FIG. 25 is a perspective view showing the configuration and operation of the output region of the bonding object transfer module according to some embodiment of the present invention.

FIG. 25 is a perspective view showing the configuration and operation of the output region of the bonding object transfer module according to some embodiment of the present invention. According to some embodiment of the present invention, the mechanical configuration and operation of the output region (i.e., export area) of the bonding object transfer module are explained below in FIG. 25.

The configuration of the output conveyor 950 is generally the same as that of the input conveyor 910 discussed above, except that there is no preheating stage 914 for preheating the bonding object 11 on the output conveyor 950.

Thus, when the bonding object 11 after laser reflow treatment is transported to the output region (i.e., export area) while seated on the vacuum chuck 940, in a reverse sequence, the picker unit 970 absorbs the bonding object 11 on the vacuum chuck 940 and delivers it to the output conveyor 950, and then the output conveyor 950 moves horizontally to unload the bonding object 11 outside using the wire caterpillar 951.

Figure 26B:
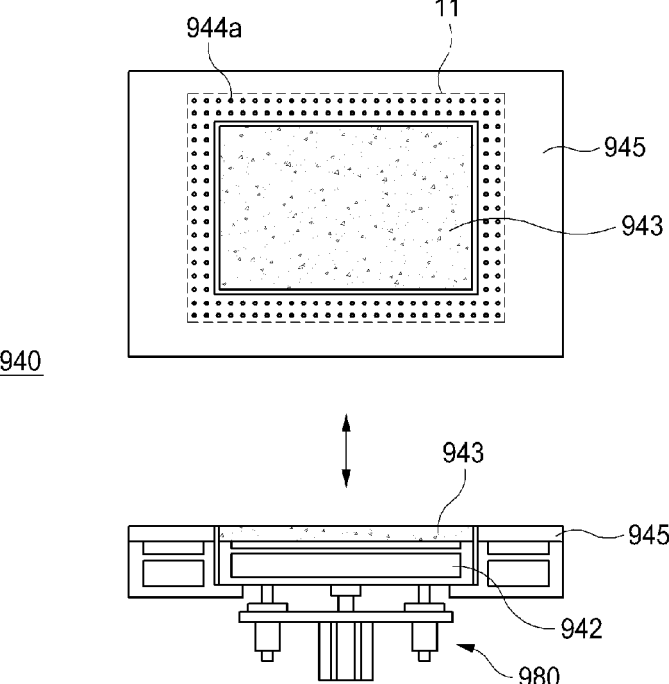

FIGS. 26A and 26B show exemplary views illustrating the configuration and operation of the vacuum chuck of the bonding object transfer module of the present invention. FIG. 26A shows a top view and a lateral cross-sectional view of a porous absorption plate according to one embodiment of the present invention. FIG. 26B show a plan view and a lateral cross-sectional view of a porous absorption plate according to another embodiment of the present invention.

Referring to FIG. 26A, a plurality of porous absorption plates are provided on the vacuum chuck 940 according to an embodiment of the present invention. The porous absorption plates may be divided into an oblong central absorption plate 943 for absorbing the bottom middle portion of the bonding object 11 and a peripheral absorption plate 944 encompassing the central absorption plate 943 for absorbing the bottom peripheral part of the bonding object 11.

Referring to the top view, when bonding object 11 is placed on the porous absorption plates 943, 944, the bonding object 11 is vacuum absorbed by suction means such as an air compressor installed in the central absorption plate 943 and the peripheral absorption plate 944 to be fixed to the upper surface of the vacuum chuck 940 in a widespread state.

Referring also to the lateral cross-sectional view in FIG. 26A, the central absorption plate 943 and the peripheral absorption plate 944 are divided at an interval. Since an absorption plate lifting unit 980 is installed under the central absorption plate 943, this embodiment may have other configurations without the picker units 930, 970 discussed above. That is, the central absorption plate 943 may receive the bonding object 11 directly from the input conveyor 910, in which case the central absorption plate 943 lifts upwards to receive the bonding object 11 directly from the input conveyor 910, and then it lifts downwards after receiving the bonding object 11 from the wire caterpillar 911 of the input conveyor 910.

In addition, a heating block 942 may be further installed directly below the central absorption plate 943. The heating block 942, like the preheating stage 914 of the input conveyor 910, serves to preheat the bonding object 11 to a predetermined temperature during the loading of the bonding object until it is laser reflowed.

On the other hand, FIG. 26B shows the configuration and operation of the porous absorption plate according to another embodiment of the present invention. In contrast to the case in FIG. 26A, the peripheral absorption plate 945 comprises aluminium, not the porous material as in the central absorption plate. In addition, a plurality of suction holes 944a are further formed in the peripheral absorption plate 945 to absorb the bottom rim portion of the bonding object 11 more firmly along the circumference of the central absorption plate 943. Other configurations and operations are the same as the case in FIG. 26A, so a detailed description will be omitted.

In addition, as discussed regarding FIGS. 26A and 26B, by controlling the vacuum absorption force of the central absorption plate 943 and the peripheral absorption plate 944, 945 of the vacuum chuck 940, bending or wrinkle of the printed circuit board (PCB) or the flexible PCB (FPCB) in the bonding object 11 can be stretched to a certain extent. Accordingly, the deviation in the vertical height of the electronic components seated on the substrate decreases, and process failure due to the excessive pressurization on the particular electronic component can also be improved.

Figure 27:
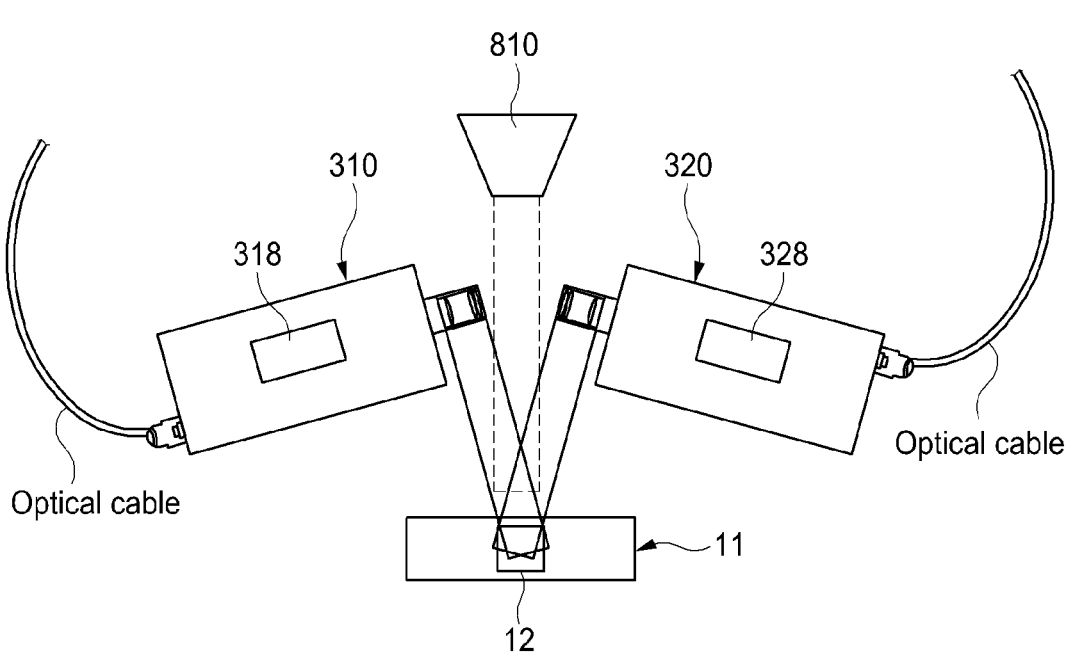
FIG. 27 is a schematic view showing the configuration and operation of the multi-laser module according to some embodiment of the present invention.
Figure 28:
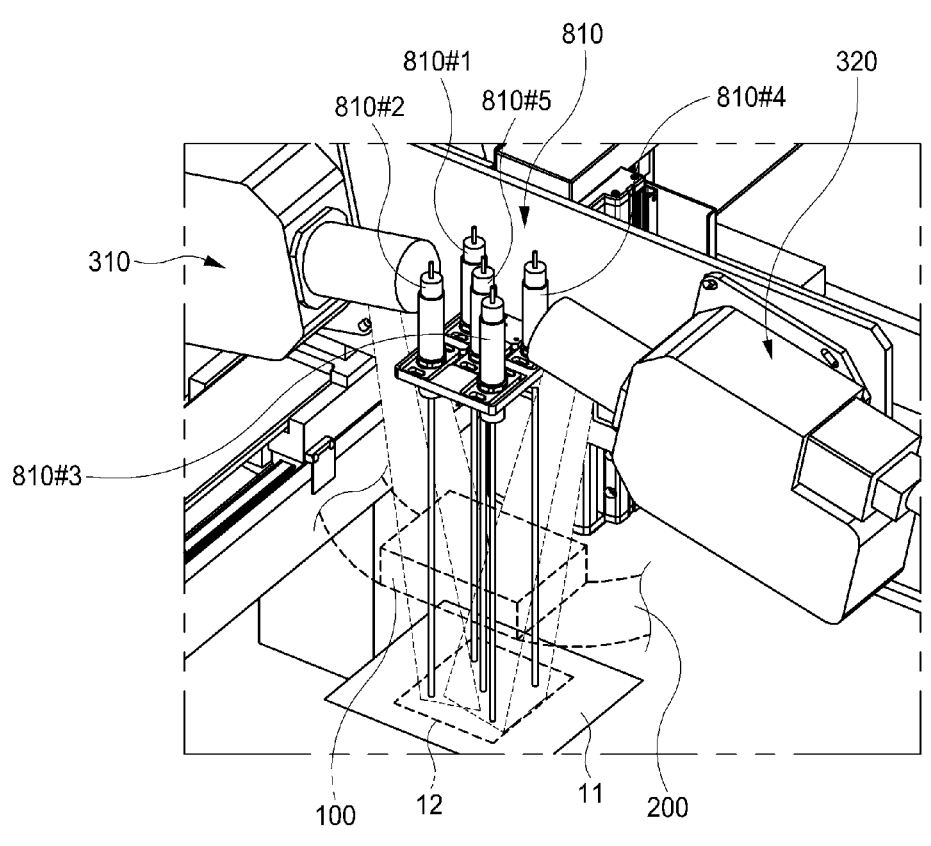
FIG. 28 is an enlarged perspective view of the temperature sensor in FIG. 27. shown by expanding the temperature sensor configuration of FIG. 27
Figure 29:
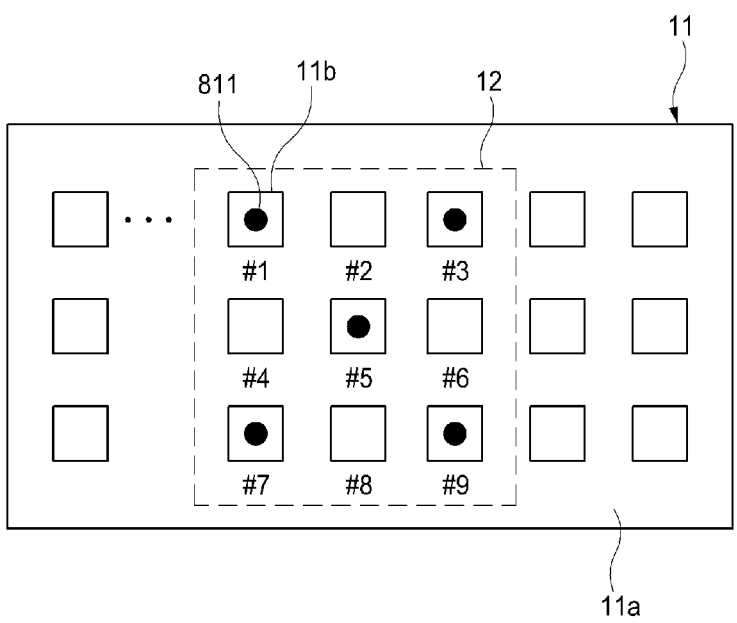
FIG. 29 is an enlarged top view of the bonding object in FIG. 28.

FIG. 27 is a schematic view showing the configuration and operation of the multi-laser modules according to some embodiment of the present invention. FIG. 28 is an enlarged perspective view of the temperature sensor in FIG. 27. FIG. 29 is an enlarged top view of the bonding object in FIG. 28.

Referring to FIGS. 27 to 29, the configuration and operation of the multi-laser module according to some embodiment of the present invention will be explained in detail.

Referring to FIG. 27, the multi-laser module consists of a first laser module 310 and a second laser module 320, and an infrared temperature sensor 810 is provided between the first laser module 310 and the second laser module 320 to measure the temperature of the superimposed laser beam irradiated from the first and second laser modules 310, 320.

The first laser module 310 and the second laser module 320 are equipped with beam profilers 318 and 328, respectively, to monitor the output and intensity of the laser beam from the first and second laser modules 310, 320 at all times. The beam profiler 318, 328 is provided on the path of the laser beam from the first and second laser modules 310, 320 to measure the output and intensity of the laser beam. A portion of the laser beam is irradiated onto or transmitted into the beam profiler 318, 328.

According to some embodiment of the present invention, the infrared temperature sensor 810 may be a single infrared temperature sensor 810. The single infrared temperature sensor measures the surface temperature value of area 12 in which the laser beam is superimposed. The single infrared temperature sensor 810 may measure the temperature sequentially at multiple points in the area where the laser beam is superimposed to measure the total temperature distribution over the area of superposition.

If temperature distribution is measured as uneven, an overflow bonding failure may occur due to overheating the solder at a point where the measured temperature value is higher than the solder melting temperature. Conversely, a different bonding failure may occur when the solder is not sufficiently melted or connected at a point where the measured temperature value is lower than the solder melting temperature.

In the present invention, the infrared temperature sensor 810 measures the temperature of the superposed irradiation region to compensate for the temperature distribution at the superposed irradiation region by controlling the output or intensity of each laser beam from the first and second laser modules 310, 320.

On the other hand, it is also possible to have a plurality of infrared temperature sensors 810 in other embodiment of the present invention. Referring to FIG. 28, the plurality of infrared temperature sensors of the present invention may consist of, for example, five infrared temperature sensors 810 #1, 810 #2, 810 #3, 810 #4, 810 #5. One temperature sensor 810 #1, 810 #2, 810 #3, 810 #4 may be positioned at each corner of the square arrangement, and one temperature sensor 810 #5 may be disposed of in the center. In FIG. 29, when five infrared temperature sensors 810 #1, 810 #2, 810 #3, 810 #4, and 810 #5 simultaneously irradiate the infrared beam, the infrared beam is irradiated, and the temperature is measured in the electronic components 11$b$#1, 11$b$#3, 11$b$#7, 11$b$#9 located in each corner of the rectangular area 12 and the electronic component 11$b$#5 located in the center of the rectangular area 12.

The location or number of electronic components 11$b$ at which the temperature is measured may vary, and the surface temperature of the substrate on which no electronic components are placed can also be measured. More accurate temperature distribution in the area where the laser beam is superposed will be obtained by measuring the temperature value of the substrate and the electronic components as much as possible.

It will be understood that the value of temperature distribution shall be compensated when adjusting the angle and height of the irradiation of the first or the second laser beam.

FIGS. 30A to 30E are schematic diagrams illustrating the step-by-step process of the laser reflow method of the present invention. Hereafter, each step of the laser reflow process in accordance with some embodiment of the present invention will be explained in detail.

Figure 30A:
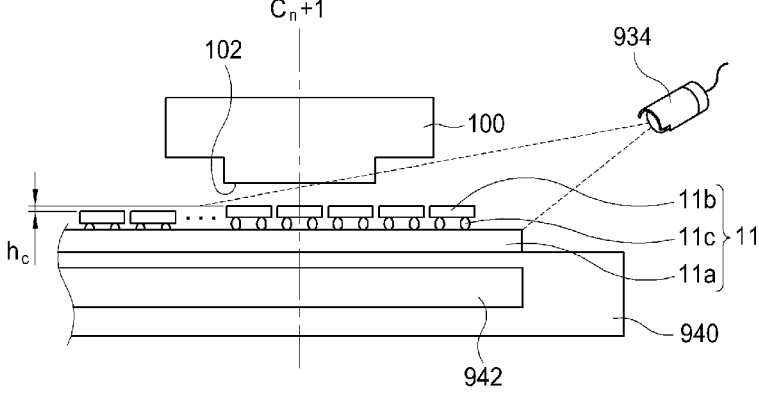
FIGS. 30A to 30E are schematic diagrams illustrating the step-by-step process of the laser reflow method of the present invention.

FIG. 30A is a diagram in which the transmissive pressurizing member 100 is aligned with centerline Cn+1. When the pressurization area 102 of the transmissive pressurization member 100 is aligned to centerline Cn+1, the vision unit 934 photographs the electronic components 11$b$ located under the pressurization area 102 of the transmissive pressurization member 100. The vision unit 934 determines whether the electronic components 11$b$ are symmetrically disposed of with reference to the centerline Cn+1 of the pressurization area 102 of the transmissive pressurization member 100.

It is determined whether the electronic components 11$b$ located directly below the pressurization area 102 of the transmissive pressurization member 100 are positioned to correspond to the pressurization area 102. When the electronic components 11$b$ are disposed of in three rows under the pressurization area 102 as in FIG. 30A, it is determined whether the electronic components 11$b$ are symmetrically disposed of in 1.5 rows by 1.5 rows regarding the centerline Cn+1 of the pressurization area 102. Accordingly, when the pressurization area 102 of the transmissive pressurization member 100 is pressed to the area where the electronic components 11$b$ are arranged in three rows, a balanced pressing can be performed without bias to either side.

Referring also to FIG. 30A, the electronic components 11$b$ of the bonding object 11 are arranged to be bonded with the solder 11$c$ for bonding to the upper surface of the substrate 11$a$, and the substrate 11$a$ is vacuum absorbed and fixed by the lower vacuum chuck 940. The bonding object 11, including the substrate 11$a$, the electronic components 11$b$ and the solder 11$c$, are continuously preheated to a predetermined temperature as the heating block 942 is provided inside the vacuum chuck 940. The preheat temperature is preferably set below the melting temperature of the solder. For example, it may be maintained below 200° C. at which no thermal damage is inflicted on the substrate 11$a$ and the electronic component 11$b$ even if they are exposed for a while.

If the bonding object 11 is not preheated as described above, the bonding object 11 shall be heated rapidly from room temperature to the melting temperature of the solder 11$c$ only by the thermal energy of the laser beam during the laser reflow treatment, in which case the rapid heating may cause a bonding failure such as overflow to the solder 11$c$. Therefore, a stepwise temperature rise from the preheat temperature to the melting temperature of the solder 11$c$ can minimize bonding failures. For example, while the melting temperature of the solder 11$c$ may vary depending on the soler material, it may be more than 200° C., the melting temperature of the ordinary solder paste.

Figure 30B:
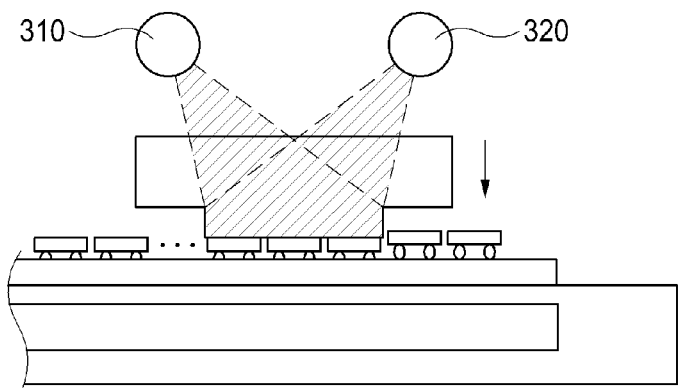

FIG. 30B shows a diagram in which the transmissive pressurization member 100 is pressurized and laser-irradiated with reference to the centerline Cn+1. As in FIG. 30A, when it is determined by the vision unit 934 that the centerline Cn+1 of the pressurization area 102 of the transmissive pressurization member 100 coincides with the centerline of the electronic components 11$b$ to be bonded, the transmissive pressurization member 100 moves downwards to press the electronic components 11$b$.

The laser beam may be irradiated simultaneously or sequentially with the pressurization of the transmissive pressurization member 100. For example, the laser beams from the multi-laser module, such as the first laser module 310 and the second laser module 320, can be superposed simultaneously as the pressurization of the transmissive pressurization member 100.

Accordingly, the bonding object 11 is heated step-by-step from the preheat temperature to the melting temperature of the solder 11$c$ by the superposed irradiation of the laser beam. Eventually, the solder 11$c$ located at the bottom of the electronic components 11$b$ melts and the electronic components 11$b$ are bonded to the substrate 11$a$. (The difference in height before and after bonding is denoted by hc in FIG. 30A)

Figure 30C:
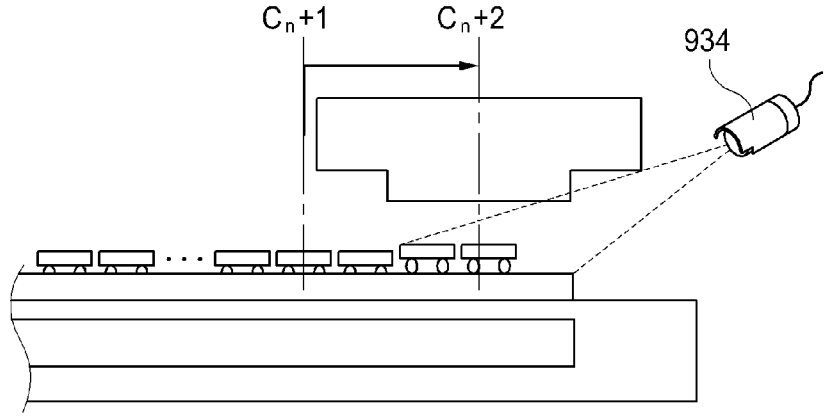
Figure 30D:
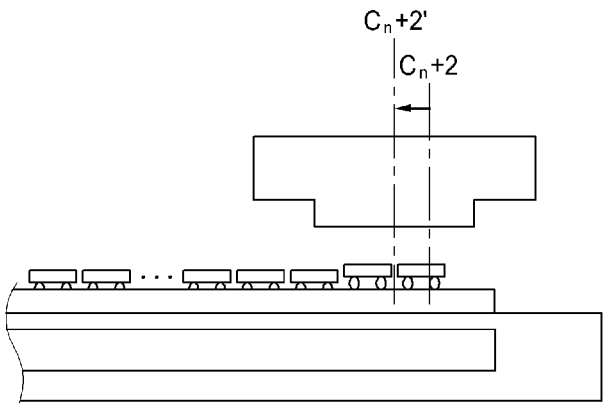
Figure 30E:
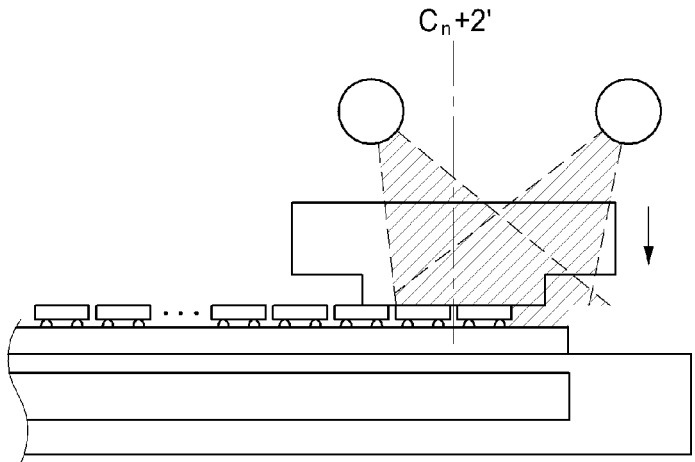

In FIG. 30C, the transmissive pressurization member has moved to be aligned to the centerline Cn+2. In FIG. 30D, the transmissive pressurization member has moved again to be aligned with a modified centerline Cn+2'. In FIG. 30E, the transmissive pressurization member is under pressurization and laser-irradiation at the modified centerline Cn+2'.

Referring to FIG. 30C, after completing the previous laser reflow process at the centerline Cn+1, the transmissive pressurization member 100 moves horizontally to the centerline Cn+2 to process the next three rows of electronic components 11$b$. At this time, the vision unit 934 again photographs the arrangement of the electronic components 11b disposed below the pressurization area 102 of the transmissive pressurization member 100.

However, when it is determined that the electronic components 11b disposed below the pressurization area 102 of the transmissive pressurizing member 100 are not symmetrically disposed relative to the centerline Cn+2 as shown in FIG. 30C, the pressurization and laser irradiation are not immediately carried out. Since the electronic components 11b are asymmetrically disposed relative to centerline Cn+2 of the pressurization area 102 of the transmissive pressurization member 100, the pressurization of the transmissive pressurization member 100 may cause an unequal pressure on the electronic components 11b to result in an undesirable bonding.

Therefore, in the present invention, the controller (not shown) moves the transmissive pressurization member 100 toward the newly modified centerline Cn+2', shown in FIG. 30D. Accordingly, the horizontal position of the transmissive pressurization member 100 is aligned with the modified centerline Cn+2'. Accordingly, the horizontal positions of the electronic components 11b disposed under the transmissive pressurization member 100 are symmetrically disposed relative to the modified centerline Cn+2'. In this state, as shown in FIG. 30E, the transmissive pressurization member 100 moves downwards to press the electronic components 11b.

Referring to FIG. 30E, while the transmissive pressurization member 100 moves to the modified centerline Cn+2' to perform pressurization, the first and second laser modules 310, 320 do not change the horizontal position from the centerline Cn+2 to Cn+2', and the laser beams are irradiated with an alignment with the original centerline Cn+2.

The reason why the laser modules 310 and 320 do not modify the horizontal position, unlike the transmissive pressurization members 100, is that there is a risk that the laser beam may be re-irradiated to some electronic component 11b that has already been bonded in the previous laser reflow process if the laser beam is irradiated relative to the modified centerline Cn+2'. If the laser beam is re-irradiated in some solder 11c after the previous reflow treatment has been completed, the solder 11c may melt again and thereby cause a bond failure. Therefore, in the present invention, when the asymmetrically disposed of electronic components 11b are pressurized and laser-irradiated, only the position of the transmissive pressurization members 100 is modified to be aligned with a new centerline Cn+2', and the position of the first or second laser modules 310, 320 does not change, so that the chances of occurrence of various bonding failure factors can be minimized.

FIGS. 31A to 31D are schematic diagrams illustrating the step-by-step process of the laser reflow method of the present invention. Hereafter, various bonding modes that can be combined with others will be explained in detail.

Referring to FIGS. 31A to 31D, the first bonding mode of the present invention is the most basic bonding mode, including the step of moving the pressurization area 102 of the transmissive pressurization member 100 downwards to contact the bonding object 11 without applying pressure; irradiating the laser beam to the bonding object 11 through the transmissive pressurization member 100; and terminating the irradiation of the laser beam and moving the transmissive pressurization member 100 upwards.

Here, in contacting the transmissive pressurization member 100 with the bonding object 11, the pressing bracket 720 moves downwards by the ball screw 750 and the motor 760 connected thereto. Since the pressing bracket 720 is mounted with a holder unit 500 and a transmissive pressurizing member 100, the transmissive pressurization member 100 is eventually moved downwards by driving the motor 760.

Figure 31A:
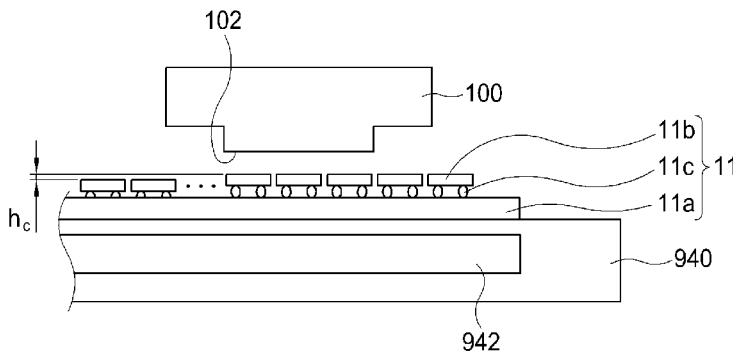
FIGS. 31A to 31D are schematic diagrams showing the step-by-step process of the laser reflow method of the present invention.
Figure 31B:
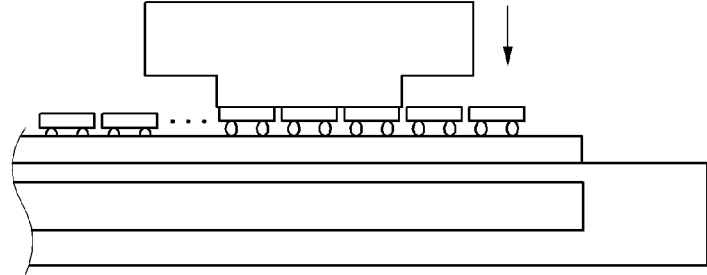

Referring to FIG. 31B, when the transmissive pressurization member 100 moving downwards encounters the electronic component 11b of the bonding object 11, the operation of the motor 760 for moving the transmissive pressurization member 100 downwards stops. Here, the transmissive pressurization member 100 is in contact with the upper surface of the electronic component 11b without applying any pressurization to it. Since the motor is in a locked state, the height of the transmissive pressurization member 100 is also fixed so that it cannot move in a vertical direction.

Figure 31C:
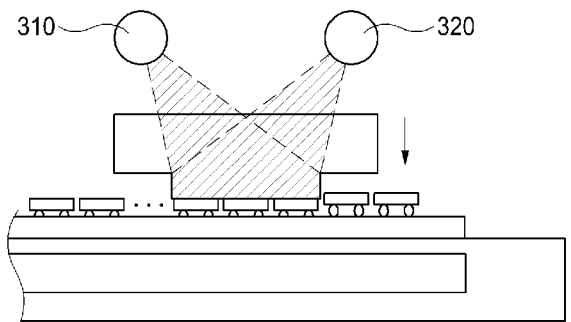

Referring to FIG. 31C as the next step, while the transmissive pressurization member 100 is in contact with the upper surface of the electronic component 11b, the multilaser modules 310, 320 placed above the transmissive pressurization member 100 irradiate the laser beam to the bonding object 11 through the transmissive pressurization member 100.

At this time, the laser beams are superposed to deliver the homogenized laser beam to the plurality of electronic components 11b and solder 11c. As mentioned above, since the bonding object 11 has already been preheated at a specific preheating temperature, for example, less than 200° C., the laser beam does not need to rapidly heat the boding object 11 to the melting temperature of solder 11c, for example, 250° C. Further, when the laser reflow begins, the pressurization area 102 of the transmissive pressurization member 100 is already in contact with the upper surface of the electronic components 11b. It prevents the electronic components 11 from being bent or lifted upward during the melting of the solder 11c.

Figure 31D:
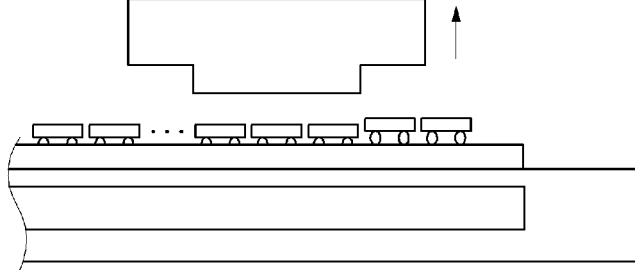

After the soldering is completed, the first bonding mode is completed by terminating the irradiation of the laser beam and moving the transmissive pressurization member 100 upwards, as shown in FIG. 31D.

We will look at some embodiments having other bonding modes in which several steps are added to the first bonding mode.

In the second bonding mode, unlike the first bonding mode described above, after the transmissive pressurization member 100 contacts the electronic component 11b of the bonding object 11, the pressurization cylinder 730 placed above the transmissive pressurization member 100 presses the transmissive pressurization member 100 to a certain range.

After that, if the laser beam is irradiated while the transmissive pressurization member 100 presses the bonding object 11 as described above, the pressure is released as the solder 11c of the bonding object 11 melts. At this time, the height of the electronic component 11b is lowered due to the compression or reduction of the solder 11c by a certain height (hc, see FIG. 31A). If the motor 760 is unlocked in this state, the transmissive pressurization member 100 gradually moves downward by self-weight. Eventually, the transmissive pressurization member 100 moves downward by a distance corresponding to the pressing force applied by the pressing cylinder 730 and the pressure is maintained.

The second bonding mode differs from the first bonding mode. The pressure is applied before the laser beam is irradiated. The transmissive pressurization member 100 moves downward to maintain the pressure when the laser beam is applied, and the solder 11c is melted. As a result, the pressure exerted on the solder 11c, even at the melting state, remains constant. The lifting of the electronic component 11*b* and the poor connection of the solder 11*c* are reduced, and the soldering quality is enhanced.

The third bonding mode is the same as the first bonding mode in that the laser beam is irradiated without applying pressurization when the transmissive pressurization member 100 contacts the electronic component 11*b* of the bonding object 11.

After the laser beam is irradiated, the pressurization cylinder 730 is driven to apply pressure to the transmissive pressurization member 100 and the bonding object 11. The transmissive pressurization member 100 is fixed by locking the motor 760 to prevent vertical movement, and only the pressurization cylinder 730 applies pressurization. The third bonding mode differs from the first bonding mode in that it applies pressurization pressure after irradiation of the laser beam.

The fourth bonding mode is the same as the third bonding mode until the first step of irradiating the laser beam. Still, it differs in that it changes the height of the transmissive pressurization member 100 instead of applying pressure after the irradiation of the laser beam.

Therefore, when the laser beam begins to irradiate, the motor is unlocked, the transmissive pressurization member 100 gradually moves downwards, and eventually, the electronic component 11*b* and the melting solder 11*c* are slowly pressed. The bonding failure due to the sudden pressurization applied to the solder 11*c* melting on the laser beam can be prevented.

As discussed above, various embodiments can be made by controlling the pressure change according to the melting of the solder to prevent bonding failure.

Therefore, the present invention is not limited only by the embodiments described above. It is possible to create the same effect even if the detailed configuration or number and layout structure of the apparatus are changed or the detailed steps are changed and added. It is possible to add, delete, and modify various configurations within the scope of the technical spirit of the present invention by those of ordinary skill in the art.

DESCRIPTION OF THE NUMERALS

| | |
|---|---|
| 11: bonding object | 11a: substrate |
| 11b: electronic components | 12: laser superposition irradiation area |
| 100: transmissive pressurization member | 101: substrate |
| 101a: indented step | 102: pressurization area |
| 102a: lattice groove | 103: laser beam blocking layer |
| 104: silicone damper layer | 200: protective film |
| 210: protective film transporter | 310: first laser module |
| 318, 328: beam profiler | 320: second laser module |
| 500: holder unit | 510: base plate |
| 520: mask plate | 600: probe unit |
| 610: probe | 620: probe transporter |
| 630: probe bracket | 700: press unit |
| 710: pressure balancer | 720: pressing bracket |
| 730: pressurization cylinder | 740: pressure sensor |

-continued

| | |
|---|---|
| 750: ball screw | 760: motor |
| 770: guide member | 780: bearing joint |
| 790: stopper | 800: ionizer |
| 810: infrared temperature sensor | 811: infrared irradiation point |
| 910: input conveyor | 920, 960: horizontal transporter |
| 930, 970: absorption pad | 934: vision unit |
| 940: vacuum chuck | 942: heating block |
| 943: porous absorption plate | 950: output conveyor |
| 980: absorption plate lift unit | |

The invention claimed is:

1. A laser reflow apparatus comprising:
an actuator configured to press a transmissive pressurization member, wherein the transmissive pressurization member comprises a substrate member having a square panel shape;
a laser source configured to irradiate a laser beam to bond a plurality of electronic components to a substrate through the transmissive pressurization member to a bonding object including the plurality of electronic components arranged on the substrate while simultaneously pressing the plurality of electronic components with the transmissive pressurization member;
a conveyor configured to transport the bonding object imported from one side of the conveyor to an other side of the conveyor after a reflow process by the laser source and the actuator;
a holder unit configured to replaceably mount the transmissive pressurization member, the holder unit having a circular shape or a polygonal shape and comprising a base plate having a perforation formed in a center so that the transmissive pressurization member is inserted and settled;
a probe unit, provided over the holder unit, configured to check flatness of the transmissive pressurization member mounted on the holder unit; and
at least one press unit axially coupled with each of three points around a rim of the holder unit, the three points forming vertices of an imaginary equilateral triangle,
wherein a center of gravity of the imaginary equilateral triangle and a center of gravity of the transmissive pressurization member coincide, and
wherein the at least one press unit is configured to independently press each of the three points to adjust the flatness of the transmissive pressurization member.

2. The laser reflow apparatus of claim 1, wherein the probe unit comprises:
a probe configured to measure flatness by stabbing at least one point on an upper surface of the transmissive pressurization member;
a moving means configured to move the probe horizontally or vertically; and
a probe bracket configured to fix the probe and the moving means.

3. The laser reflow apparatus of claim 2, wherein the probe is configured to probe four or more positions including each corner point of a rectangular-shaped upper surface of the transmissive pressurization member.

* * * * *